United States Patent
Kahtava et al.

(10) Patent No.: US 10,932,279 B2
(45) Date of Patent: *Feb. 23, 2021

(54) METHODS, BASE STATION, INFRASTRUCTURE NODE AND TERMINAL FOR MEASUREMENTS AND DELAY-SENSITIVE VEHICLE-RELATED COMMUNICATIONS

(71) Applicant: Sony Corporation, Tokyo (JP)

(72) Inventors: Jussi Tapani Kahtava, Basingstoke (GB); Hideji Wakabayashi, Basingstoke (GB)

(73) Assignee: SONY CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/586,048

(22) Filed: Sep. 27, 2019

(65) Prior Publication Data

US 2020/0029341 A1    Jan. 23, 2020

Related U.S. Application Data

(63) Continuation of application No. 15/735,794, filed as application No. PCT/EP2016/064152 on Jun. 20, 2016, now Pat. No. 10,433,319.

(30) Foreign Application Priority Data

Jun. 29, 2015 (EP) .................................. 15174399

(51) Int. Cl.
*H04W 72/10* (2009.01)
*H04W 28/26* (2009.01)
(Continued)

(52) U.S. Cl.
CPC ............. *H04W 72/10* (2013.01); *H04W 4/44* (2018.02); *H04W 28/26* (2013.01); *H04W 72/044* (2013.01); *H04W 84/005* (2013.01)

(58) Field of Classification Search
CPC ..... H04W 72/10; H04W 72/044; H04W 4/44; H04W 28/26; H04W 84/005
See application file for complete search history.

(56) References Cited

U.S. PATENT DOCUMENTS 10,433,319 B2 * 10/2019 Kahtava ................ H04W 28/26
2008/0305799 A1 * 12/2008 Zuniga .............. H04W 36/0072
455/437

(Continued)

FOREIGN PATENT DOCUMENTS

JP       2010-103945 A    5/2010
WO      2014/015470 A1    1/2014

OTHER PUBLICATIONS

European Communication Pursuant to Article 94(3) EPC dated Feb. 13, 2019 in European Application No. 16734223.7-1215.

(Continued)

*Primary Examiner* — Afshawn M Towfighi
(74) *Attorney, Agent, or Firm* — Xsensus LLP

(57) ABSTRACT

A method allocating resources in a mobile telecommunications system including a base station, one or more terminals, and one or more infrastructure nodes configured to communicate via a wireless interface allocated for successive time periods. The method includes: obtaining measurements that relate to a link between a first of the terminals and one of the infrastructure nodes; identifying communications between the first terminal and the one infrastructure node as delay-sensitive communications; identifying, based on the obtained measurements and identification of the communications between the first terminal and the one infrastructure nodes as delay-sensitive communications, resources to allocate for the first terminal to communicate with one or more of the infrastructure nodes, selected from two or more of the time periods; and allocating the identified resources for the (Continued)

first terminal to communicate with the one or more of the infrastructure nodes during the two or more time periods.

20 Claims, 12 Drawing Sheets

(51) Int. Cl.
*H04W 4/44* (2018.01)
*H04W 72/04* (2009.01)
*H04W 84/00* (2009.01)

(56) References Cited

U.S. PATENT DOCUMENTS

2012/0163275 A1 6/2012 Kim et al.
2015/0282210 A1* 10/2015 Li .................... H04W 74/0833
455/436

OTHER PUBLICATIONS

Holma H. et al, "LTE for UMTS OFDMA and SC-FDMA Based Radio Access", John Wiley & Sons, Ltd, Jan. 2010, (Total 8 pages).
LTE; Evolved Universal Terrestrial Radio Access (E-UTRA); Medium Access Control (MAC) protocol specification (3GPP TS 36.321 version 12.5.0 Release 12); ETSI TS 136 321 V125.0, 2015, Technical Specification, (Total 79 pages).
International Search Report dated Sep. 8, 2016 in PCT/EP2016/064152 filed Jun. 20, 2016.
Japanese Office Action dated Nov. 17, 2020, in corresponding Japanese Patent Application No. 2017-566072.

* cited by examiner

METHODS, BASE STATION, INFRASTRUCTURE NODE AND TERMINAL FOR MEASUREMENTS AND DELAY-SENSITIVE VEHICLE-RELATED COMMUNICATIONS

CROSS-REFERENCE TO RELATED APPLICATIONS

The present application is a continuation of U.S. application Ser. No. 15/735,794, Dec. 12, 2017, which is based on PCT filing PCT/EP2016/064152, filed Jun. 20, 2016, which claims priority to EP 15174399.4, filed Jun. 29, 2015, the entire contents of each are incorporated herein by reference.

TECHNICAL FIELD OF THE DISCLOSURE

The present disclosure relates to methods, base station, infrastructure node and terminal, and more broadly considers situations surrounding the allocation of resources in a mobile telecommunications system.

BACKGROUND OF THE DISCLOSURE

The "background" description provided herein is for the purpose of generally presenting the context of the disclosure. Work of the presently named inventors, to the extent it is described in this background section, as well as aspects of the description which may not otherwise qualify as prior art or may not form part of the state of the art at the time of filing, are neither expressly or impliedly admitted as prior art or state of the art against the present invention.

Mobile telecommunication systems, such as those based on the 3GPP defined UMTS and Long Term Evolution (LTE) architecture, are able to support more sophisticated services than simple voice and messaging services offered by previous generations of mobile telecommunication systems. For example, with the improved radio interface and enhanced data rates provided by LTE systems, a user is able to enjoy high data rate applications such as video streaming and video conferencing on mobile communications devices that would previously only have been available via a fixed line data connection.

The demand to deploy fourth generation networks is therefore strong and the coverage area of these networks, i.e. geographic locations where access to the networks is possible, is increasing rapidly and expected to continue to increase. However, although the coverage and capacity of fourth generation networks is expected to significantly exceed those of previous generations of communications networks, there are still limitations on network capacity and the geographical areas that can be served by such networks. These limitations may, for example, be particularly relevant in situations in which networks are experiencing high load and high-data rate communications between communications devices, or when communications between communications devices are required but the communications devices may not be within the coverage area of a network. In order to address these limitations, in LTE release-12 the ability for LTE communications devices to perform device-to-device (D2D) communications is introduced.

D2D communications allow communications devices that are in close proximity to directly communicate with each other, both when within and when outside of a coverage area or when the network fails. This D2D communications ability allows communications devices that are in close proximity to communicate with one another although they may not be within the coverage area of a network. The ability for communications devices to operate both inside and outside of coverage areas makes LTE systems that incorporate D2D capabilities well suited to applications such as public safety communications, for example. Public safety communications require a high degree of robustness whereby devices can continue to communicate with one another in congested networks and when outside a coverage area.

Other types of relatively new protocols, features, arrangements or sets thereof of mobile telecommunications systems include for example relay node technology which can extend the coverage for base station or another node for communicating with terminals, in terms of throughput and/or geographical coverage. Small cells may also be provided wherein a small cell can be controlled by a base station or operate as a base station with a limited coverage (either geographically or in the terminals accepted by the small cell, e.g. only terminals associated with a specific customer/company account may be able to connect to it). As a result, a variety of technologies, some of them alternative and other compatible technologies, can be now be used in a mobile telecommunication system.

In parallel, the development of vehicle-related communications has emerged and attracted a growing interest. These communications can sometimes be called vehicle-to-everything (V2X) communications which can refer to any one or combination of the following: vehicle-to-vehicle (V2V) communications, vehicle-to-infrastructure (V2I), vehicle-to-pedestrians (V2P) communications, vehicle-to-home (V2H) communications and any other type of vehicle-to-something communications. They enable a vehicle to communicate with its environment, be it another vehicle, a traffic light, a level (railroad) crossing, infrastructure equipment in the vicinity of a road, a pedestrian, a cyclist, etc. In a typical V2I scenario, V2I communications is used for collision prevention, driver alerting and/or other intersection related activity. In this kind of embodiment, the V2X-enabled terminal has to find out the relevant RSU to connect to and exchange information with. More generally, this new set of technologies can enable a variety of features such a convoying of vehicles, safety features, environmental friendly car driving and/or management and can also facilitate the operation of driverless/autonomous cars.

Whilst D2D communications techniques can provide an arrangement for communicating between devices, D2D is generally targeting public safety uses, so-called machine type communication (MTC) applications—which tend to be low-throughput and high-latency communications—or conventional terminals. As a result, they are not designed to deal with low-latency communications required for V2X communications. As an illustration, V2X systems can be required to have a delay of less than 100 ms from an event to a corresponding action. For example, from the moment a first car in front of a second car suddenly brakes until the second car starts braking as well, the time must be less than 100 ms in some circumstances. This takes into account the time for the first vehicle to detect the braking, signal the braking to other vehicles, the second vehicle receiving the signal, processing the signal to decide whether to take any actions, up to the moment the second vehicle actually starts braking. Such a delay requirements therefore does not leave much time for the first vehicle to signal the situation to the other vehicles, including the second vehicle, and the V2X communications should be carried out in a high priority, high reliability and low-latency manner as much as possible. A low priority may delay the communications more than necessary, a low reliability may result in retransmissions being carried out which also significantly increase the delay in the transmissions while a high latency clearly increases the risk of taking up too much of the time period allocated from an event to the corresponding action.

In contrast, in a conventional D2D environment, the resources are allocated in one of two ways which may not be presently suitable for V2X environments. In a first mode, the resources are allocated on request from the terminals and for time periods of generally 40 ms. As a result, by the time a terminal requests resources, receives the resource allocation response and uses the allocated resources to transmit its message, up to 80 ms may have passed which is clearly unacceptable in a V2X environment. Additional, if the vehicle is in a vehicle which is moving at a relatively high speed, identifying which other node (e.g. terminal, relay node, base station or any other mobile system node) is likely to be suitable for communicating efficiently with the terminal can be challenging. While, at a moment in time, a first node may be the closest and/or have the assumed best link with the terminal, by the time resources are allocated and the terminal sends signals, the first node may no longer be the closest and/or have the assumed best link with the terminal (if for example the terminal is quickly moving away from the node). As a result, transmissions from the terminal with the first node may suffer from a low-reliability and/or high-latency which is also not desirable for V2X communications. As a result, the present telecom systems and arrangements, and in particular D2D ones, face a large number of problems to become suitable or more suitable for V2X or V2X-like types of communications.

SUMMARY OF THE DISCLOSURE

According to an example embodiment of the present technique there is provided a method of allocating resources in a mobile telecommunications system, the system comprising a base station configured to communicate via a wireless interface with one or more terminals and one or more infrastructure nodes configured to communicate via the wireless interface with the one or more terminals, wherein resources of the wireless interface are allocated for successive periods of time. The method comprises obtaining measurements wherein a measurement relates to a link between a first terminal of the one or more terminals and one of the one or more infrastructure nodes; identifying the communications between the first terminal and the one or more infrastructure nodes as delay-sensitive communications; identifying, based on the obtained measurements and on an identification of the communications between the first terminal and the one or more infrastructure nodes as delay-sensitive communications, resources to allocate for the first terminal to communicate with one or more of the infrastructure nodes wherein the identified resources are selected from two or more of the periods of time; and allocating the identified resources for the first terminal to communicate with the one or more of the infrastructure nodes during the two or more periods of time.

According to another example embodiment of the present technique there is provided a base station for use in a mobile telecommunications system, the base station configured to communicate via a wireless interface with one or more terminals of the system, the system comprising one or more infrastructure nodes configured to communicate with the one or more terminals via the wireless interface, wherein resources of the wireless interface are allocated for successive periods of time. The base station is further configured to obtain measurements wherein a measurement relates to a link between a first terminal of the one or more terminals and one of the one or more infrastructure nodes; identify the communications between the first terminal and the one or more infrastructure nodes as delay-sensitive communications; identify, based on the obtained measurements and on an identification of the communications between the first terminal and the one or more infrastructure nodes as delay-sensitive communications, resources to allocate for the first terminal to communicate with one or more of the infrastructure nodes wherein the identified resources are selected from two or more of the periods of time; and allocate the identified resources for the first terminal to communicate with the one or more of the infrastructure nodes during the two or more periods of time.

According to a further example embodiment of the present technique there is provided circuitry for a base station for use in a mobile telecommunications system, the base station configured to communicate via a wireless interface with one or more terminals of the system, the system comprising one or more infrastructure nodes configured to communicate with the one or more terminals via the wireless interface, wherein resources of the wireless interface are allocated for successive periods of time. The circuitry comprises a controller element and a transceiver element configured to operate together to obtain measurements wherein a measurement relates to a link between a first terminal of the one or more terminals and one of the one or more infrastructure nodes; identify the communications between the first terminal and the one or more infrastructure nodes as delay-sensitive communications; identify, based on the obtained measurements and on an identification of the communications between the first terminal and the one or more infrastructure nodes as delay-sensitive communications, resources to allocate for the first terminal to communicate with one or more of the infrastructure nodes wherein the identified resources are selected from two or more of the periods of time; and allocate the identified resources for the first terminal to communicate with the one or more of the infrastructure nodes during the two or more periods of time.

According to yet another example embodiment of the present technique there is provided an infrastructure node for use in a mobile telecommunications system, the system comprising a base station configured to communicate via a wireless interface with one or more terminals, wherein resources of the wireless interface are allocated for successive periods of time. The infrastructure node is configured to communicate with the one or more terminals via the wireless interface and is further configured to: receive an allocation message for allocating resources for the infrastructure node to communicate with the first terminal wherein the resources to be allocated are selected from two or more of the periods of time; and access, based on the allocation message, resources to communicate with the first terminal during the two or more periods of time.

According to another example embodiment of the present technique there is provided circuitry for an infrastructure node for use in a mobile telecommunications system, the system comprising a base station configured to communicate via a wireless interface with one or more terminals, wherein resources of the wireless interface are allocated for successive periods of time. The circuitry comprises a controller element and a transceiver element configured to operate together to communicate with the one or more terminals via the wireless interface and being further configured to: receive an allocation message for allocating resources for the infrastructure node to communicate with the first terminal wherein the resources to be allocated are selected from two or more of the periods of time; and access, based on the allocation message, resources to communicate with the first terminal during the two or more periods of time.

According to a further example embodiment of the present technique there is provided a terminal for use in a mobile telecommunications system, the system comprising a base station configured to communicate via a wireless interface with the terminal and one or more infrastructure nodes configured to communicate with the terminal via the wireless interface, wherein resources of the wireless interface are allocated for successive periods of time. The terminal is configured to: receive an allocation message indicating resources allocated for one of the one or more infrastructure nodes to communicate with the terminal wherein the allocated resources are selected from two or more of the periods of time; and communicate, with the one of the one or more infrastructure nodes, using the resources indicated in the allocation message during the two or more periods of time.

According to yet another example embodiment of the present technique there is provided circuitry for a terminal for use in a mobile telecommunications system, the system comprising a base station configured to communicate via a wireless interface with the terminal and one or more infrastructure nodes configured to communicate with the terminal via the wireless interface, wherein resources of the wireless interface are allocated for successive periods of time. The circuitry comprises a controller element and a transceiver element configured to operate together to receive an allocation message indicating resources allocated for one of the one or more infrastructure nodes to communicate with the terminal wherein the allocated resources are selected from two or more of the periods of time; and communicate, with the one of the one or more infrastructure nodes, using the resources indicated in the allocation message during the two or more periods of time.

Various further aspects and features of the present technique are defined in the appended claims.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings wherein like reference numerals designate identical or corresponding parts, and wherein.

DESCRIPTION OF EXAMPLE EMBODIMENTS

Figure 1:
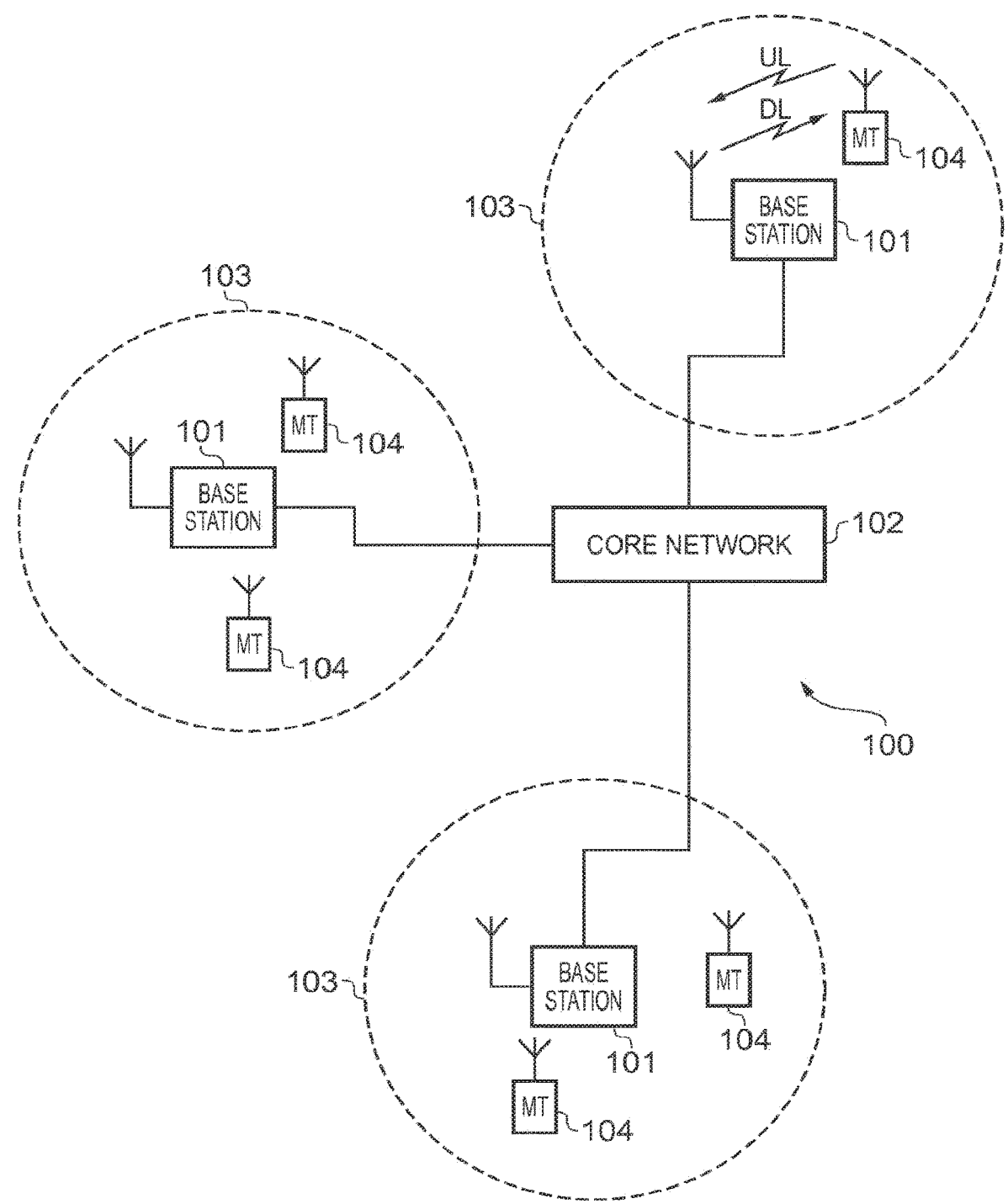
FIG. 1 provides a schematic diagram of a mobile communications system according to an example of an LTE standard.

Hereinafter preferred embodiments of the present technique will be described in detail with reference to the appended drawings. Note that, in this specification and appended drawings, structural elements that have substantially the same function and structure can be denoted with the same reference numerals, and repeated explanation of these structural elements may be omitted.

FIG. 1 provides a schematic diagram illustrating some basic functionality of a conventional mobile telecommunications network, using for example a 3GPP defined UMTS and/or Long Term Evolution (LTE) architecture. The mobile telecommunications network/system 100 of FIG. 1 operates in accordance with LTE principles and which may be adapted to implement embodiments of the disclosure as described further below. Various elements of FIG. 1 and their respective modes of operation are well-known and defined in the relevant standards administered by the 3GPP (RTM) body, and also described in many books on the subject, for example, Holma H. and Toskala A [1]. It will be appreciated that operational aspects of the telecommunications network which are not specifically described below may be implemented in accordance with any known techniques, for example according to the relevant standards.

The network 100 includes a plurality of base stations 101 connected to a core network 102. Each base station provides a coverage area 103 (i.e. a cell) within which data can be communicated to and from terminal devices 104. Data is transmitted from base stations 101 to terminal devices 104 within their respective coverage areas 103 via a radio downlink. Data is transmitted from terminal devices 104 to the base stations 101 via a radio uplink. The uplink and downlink communications are made using radio resources that are licensed for use by the operator of the network 100.

The core network 102 routes data to and from the terminal devices 104 via the respective base stations 101 and provides functions such as authentication, mobility management, charging and so on. Terminal devices may also be referred to as mobile stations, user equipment (UE), user terminal, mobile terminal, mobile device, terminal, mobile radio, and so forth. Base stations may also be referred to as transceiver stations/nodeBs/e-nodeBs/eNodeB, eNB, and so forth.

Mobile telecommunications systems such as those arranged in accordance with the 3GPP defined Long Term Evolution (LTE) architecture use an orthogonal frequency division multiplex (OFDM) based interface for the radio downlink (so-called OFDMA) and the radio uplink (so-called SC-FDMA).

The base stations 101 of FIG. 1 may be realised as any type of evolved Node B (eNodeB) such as a macro eNodeB and a small eNodeB. The small eNodeB may be an eNodeB such as a pico eNodeB, a micro eNodeB, and a home (femto) eNodeB that covers a cell smaller than a macro cell. Instead, the base station 101 may be realized as any other types of base stations such as a NodeB and a base transceiver station (BTS). The base station 101 may include a main body (that is also referred to as a base station apparatus) configured to control radio communication, and one or more remote radio heads (RRH) disposed in a different place from the main body. In addition, various types of terminals, which will be described below, may each operate as the base station 101 by temporarily or semi-persistently executing a base station function.

Any of the communications devices 104 may be realized as a mobile terminal such as a smartphone, a tablet personal computer (PC), a notebook PC, a portable game terminal, a portable/dongle type mobile router, and a digital camera, or an in-vehicle terminal such as a car navigation apparatus. The communications device 104 may also be realized as a terminal (that is also referred to as a machine type communication (MTC) terminal) that performs machine-to-machine (M2M) communication. Furthermore, the terminal apparatus 104 may be a radio communication module (such as an integrated circuit module including a single die) mounted on each of the terminals In the present disclosure, a base station providing a small cell is generally differentiated from a conventional base station mostly (and sometimes exclusively) in the range provided by the base station. Small cells include for example the cells also called femtocell, picocell or microcell. In other words, small cells can be considered as similar to macrocells in the channels and features provided to the terminals, but with the use of less power for base station transmissions, which results in a smaller range. A small can therefore be the cell or coverage provided by a small cell base station. In other examples, the term small cell can also refer to a component carrier when more than one component carriers are available.

Moreover, mobile networks can also include Relay Nodes (RN) which can further increase the complexity of the mobile system and of the reduction of interference in a small cell network. Relay technologies are known generally to provide an arrangement for receiving signals from a base station and for retransmitting the received signals to a UE in a mobile communications network, or to receive signals transmitted from a UE for re-transmission to a base station of a mobile communications network. The aim of such relay nodes is to try to extend a radio coverage area provided by a mobile communications network to reach communications devices which would otherwise be out of range of the mobile communications network or to improve the ratio of successful transmissions between a terminal and a base station.

A mobile network which includes a variety of base stations and/or relay nodes (e.g. macro-cell base stations, small cell base stations and/or relays) is sometimes referred to as a heterogeneous network.

Heterogeneous networks that would have very dense footprint of access points will no longer be designed and set up in a coordinated fashion by a single mobile network operator. Due to the sheer number of small cells needed their installation will happen much more in an ad hoc fashion, with end users and other non-MNO entities also installing small cells. The overall network management would still be done by an operator for all small cells using that MNO's assigned frequency band. This evolution from today's operator installed networks to more unplanned ad hoc networks is what we refer to as 'dense network' in this description.

Figure 2:
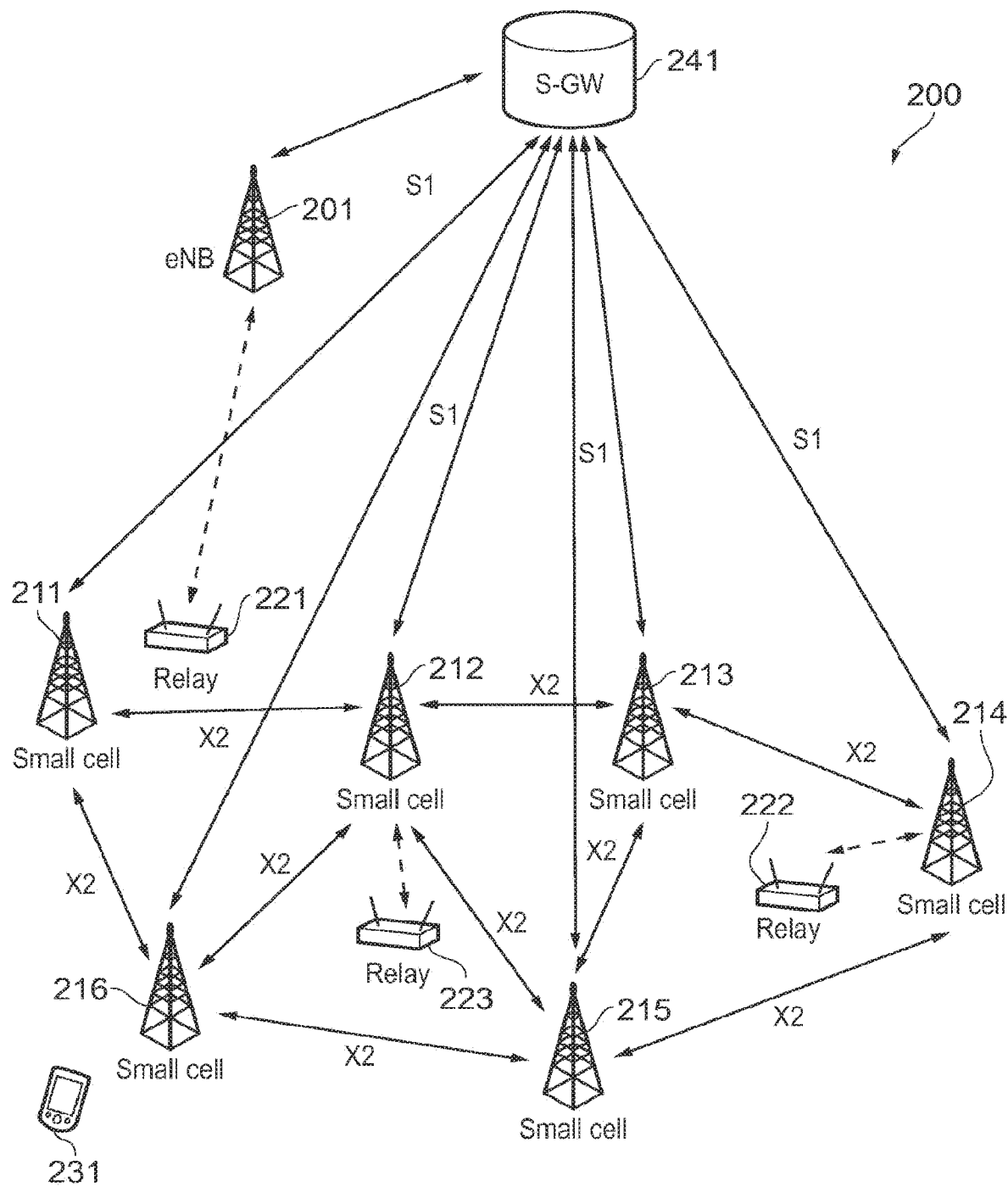
FIG. 2 illustrates an example system for communicating with at least a terminal in a heterogeneous network.

FIG. 2 illustrates an example heterogeneous system 200 for communicating with at least a terminal 231. In this system 200, a base station 201 provides a macrocell and six base stations 211-216 provide small cell coverage, potentially overlapping with the coverage of the base station 201. Additionally, three RN 221-223 are provided and are operating with base stations 201, 214 and 212, respectively. A relay node can generally be defined as a wireless radio access point for relaying transmission and which thus does not implement all of the functionalities of a base station. It is in general not directly connected to the core network but uses wireless access (inband or outband) for backhaul link to connect with a base station. In other examples, the backhaul link may also be provided over a wired connection. This is in contrast to a small cell base station which, as mentioned above, can generally operate like a base station and is thus connected to the core network, as illustrated by the arrows between the small cell base stations 211-216 and the Serving Gateway "S-GW" in FIG. 2. Relay nodes may also send or receive data with the terminals or base stations which can also add to the complexity of dealing with interference in an environment as illustrated in FIG. 2.

Figure 3:
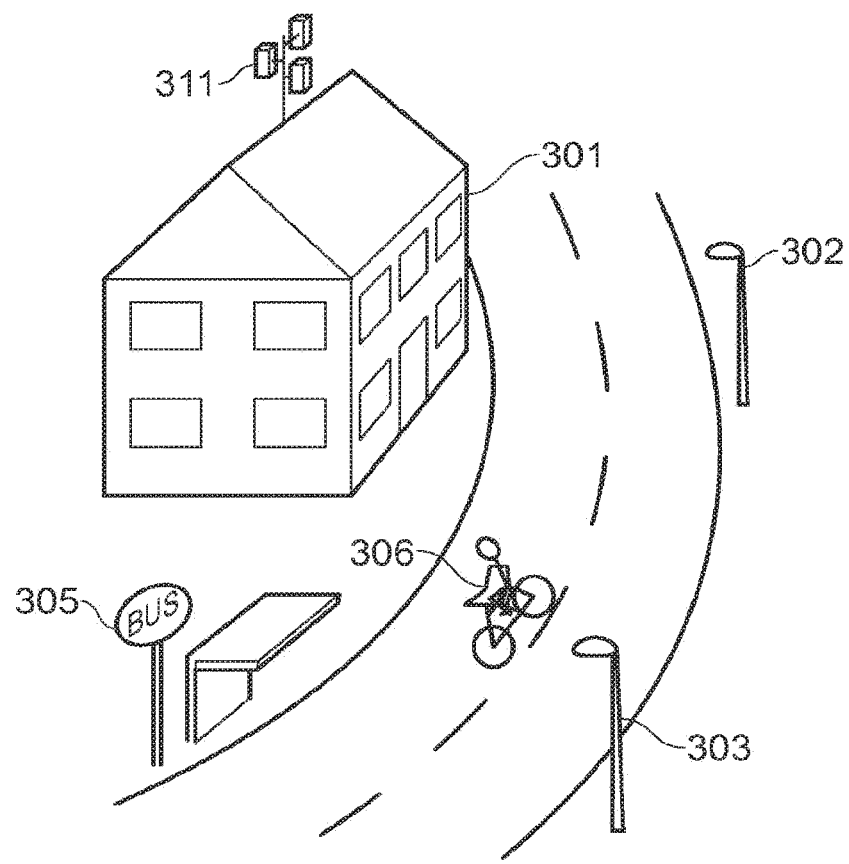
FIG. 3 illustrates an example of a heterogeneous environment.

Another example of a heterogeneous environment is illustrated in FIG. 3, where a macrocell base station 311 is provided in the same area as small cells provided by a base station 301 in or in the vicinity of a building, by a base station 302 in a first lamppost, by a base station 303 in a second lamppost, by a base station 305 provided in a bus stop and by a mobile base station 306 provided in a cyclist back-pack. In another example, the infrastructure unit 303 and 302 in lamp posts may be relay nodes relaying data in the uplink and/or downlink to the macrocell base station 311 or to another infrastructure unit (e.g. another relay node). In this example, the interference and link quality experience can vary greatly depending on traffic and on time: the cyclist may enter an interference/poor link quality zone and later leave this are, while the base station 301, if associated with an office, may potentially only be used during office hours and may be turned off during the rest of the day or the rest of the week. In such a heterogeneous network, a terminal which is V2X-capable may wish to communicate with any of the other nodes in the area depending on the circumstances, such as whether the terminal is associated with a vehicle and moving.

Figure 4:
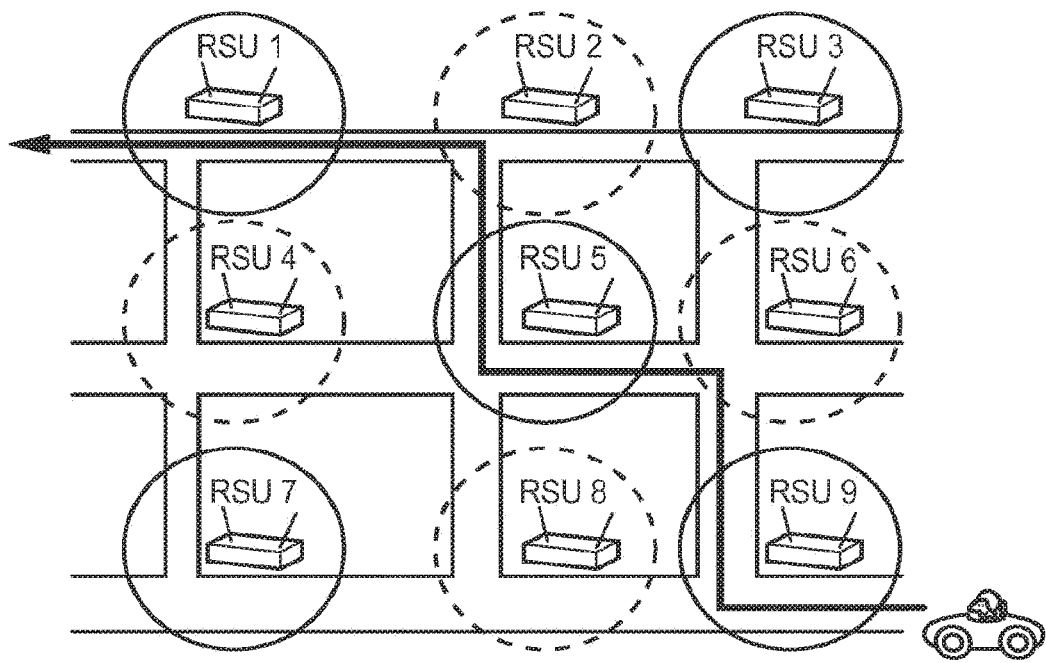
FIG. 4 illustrates an example route of a terminal associated with a vehicle in a city environment comprising several road side units (RSU)

FIG. 4 illustrates an example route of a terminal associated with a vehicle in a city environment comprising several road side units (RSU). As can be seen in this example, the vehicle, and therefore the terminal, may travel via several different routes and depending on which route is chosen, different RSU may be best suited for communicating with the terminal, in particular in a V2X environment.

With a view to quickly identifying a suitable RSU a first step may be to help differentiating RSU from other infrastructure units or mobile nodes in the network. For example, if D2D protocols are used for communications between terminals and RSUs, discovery signals from RSUs may differ from discovery signals of other D2D nodes. Example implementations include a new physical channel or signal and/or an indicator in discovery signals that may be used for RSU and/or V2X communications only and that can for example identify discovery signal for RSUs. In an alternative or complementary example, if V2X services are deployed on dedicated bands, all the discovery signals on this band would be assumed as coming from RSUs and/or other V2X nodes and no further differentiating may then be needed (although it is not excluded). If however the RSUs share a band with other types of nodes or communications (e.g. a legacy LTE network) and/or with other potential D2D services, further differentiation of discovery signals may be implemented (as discussed above). While such an arrangement would improve the speed at which RSUs can be detected and thus reduce the delay for the terminal to connect with a relevant RSU, for example by then prioritising connections with RSUs and/or V2X nodes over other communications or connections, with a view to further reducing delay, it can be attempted to identify a suitable for the terminal with a view to reducing delay compared to other RSUs or to keeping delay at an acceptable level.

Figure 5:
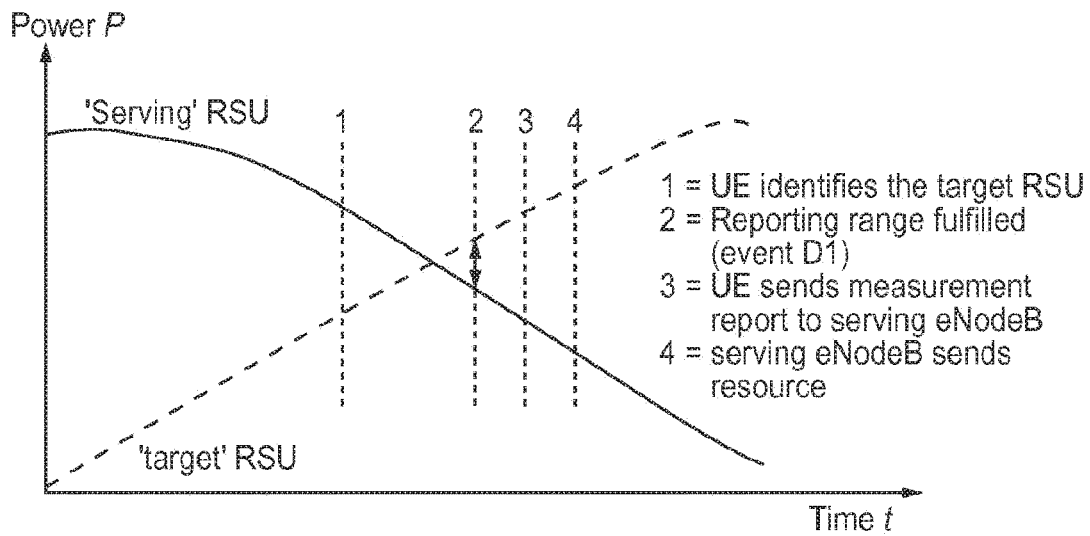
FIG. 5 illustrates a conventional decision process applied to changing serving RSU.

This can however prove challenging in a V2X environment which involves both low-delay communications and moving terminals, potentially at high speeds. For example in FIG. 4, when the terminal is in the centre of the intersection served by RSU 9, it likely may find and measure both RSU 8 and RSU 6, potentially with similarly good links. In a conventional mobile telecommunication arrangement and in the absence of any other information, the deciding factor for selecting the RSU to connect to would be based on the quality of the links between the terminal and the RSUs, for example on the respective received power from the two RSUs. An example of such a conventional decision process—applied to changing serving RSU—is illustrated in FIG. 5. The process generally follows four steps: (1) the UE identifies the target RSU, for example when a discovery signal is received from the RSU and/or when its received power becomes greater than a threshold; (2) a reporting event is detected, for example the received power of the target RSU exceeds that of the current RSU by more than a threshold; (3) as a result the terminal sends a measurement report to a relevant base station and (4) the base station effectively transfers the terminal to the target RSU by allocating resources for the terminal to communicate with the target RSU instead of the serving RSU. Returning to the example of FIG. 4 when the vehicle is served by RSU 9, there are four likely outcomes once the terminal has reached the intersection and can detect both RSU 6 and RSU 8:

RSU 6 is measured as stronger and selected, and the vehicle turns right

RSU 6 is measured as stronger and selected, and the vehicle continues straight ahead RSU 8 is measured as stronger and selected, and the vehicle turns right RSU 8 is measured as stronger and selected and the vehicle continues straight ahead Two out of the four cases above will select the most appropriate RSU with a view to trying to reduce delay in communications, in particular for a V2X-enabled terminal. However, in two remaining cases, the RSU selection is likely to cause delay in the distribution of information regarding the relevant intersection to the terminal as the terminal will then have to detect that the newly-selected RSU was not the most appropriate one and re-select the other RSU, thereby introducing delay, before it can communicate with the RSU actually located at the intersection the vehicle is using. In other words, the conventional decision process used in mobile telecommunication systems and applied to RSUs will, in a significant number of cases (possibly more than 50% if more than two routes are available to the vehicle), result in a sub-optimal selection of RSU which will cause delays. Such delays are highly unlikely to be found acceptable in a V2X environment where low-delay and high-reliability transmissions may be required and reducing these delays would thus improve the compliance with V2X and other low-delay environments.

In effect, when a V2X enabled UE traverses across a grid of RSUs, considering only the nearest/strongest RSU (in a conventional manner as discussed above) is unlikely to be found acceptable on its own. On the other hand, identifying a "relevant" RSU would improve delay reduction but can be challenging as a large number of factors can impact which RSUs may be considered as relevant or not relevant. Measurements may provide one tool with a view to facilitating the selecting a RSU which is relevant or relevant enough for a terminal, e.g. a V2X-enabled terminal. For example, based on measurements, a list of RSUs which are of good enough link quality to connect to may be determined (e.g. by a base station) and, from this list of "connectable" RSUs, it may be determined (e.g. by the base station) which RSU or RSUs are located in an expected direction of travel for the terminal, communication resources may be assigned accordingly for the terminal to communicate with the RSU (or RSUs).

Figure 6:
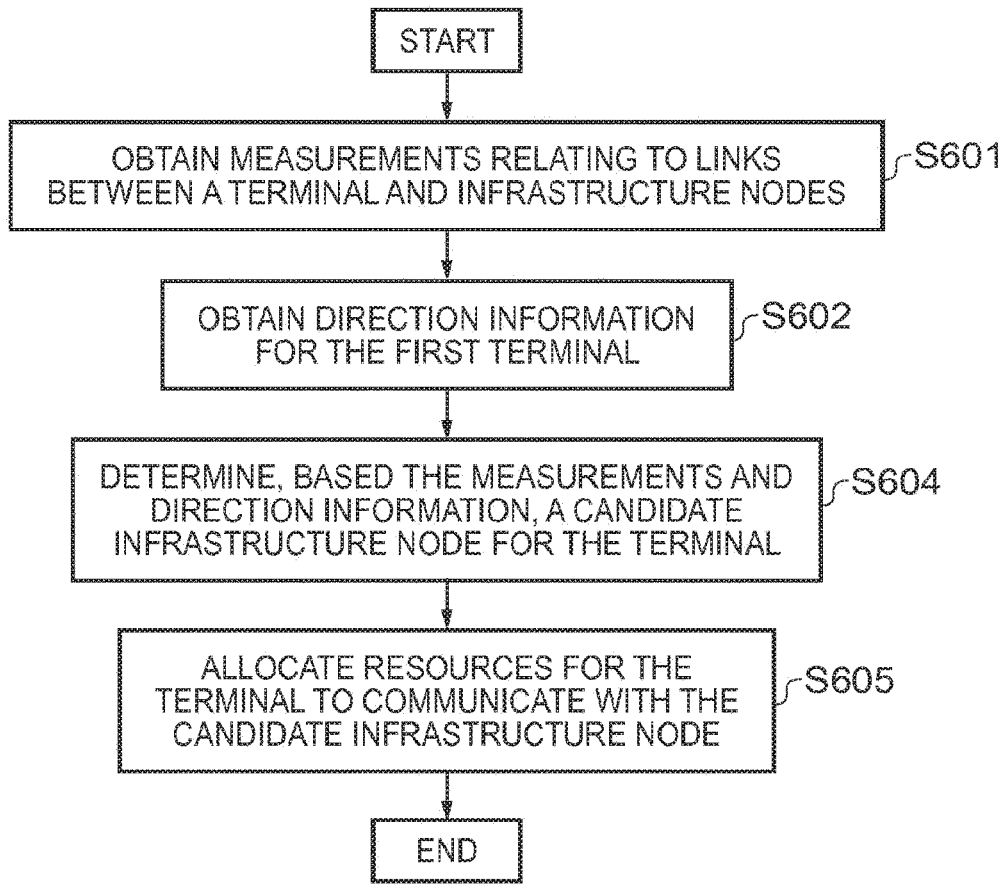
FIG. 6 illustrates an example method of allocating resources.

FIG. 6 illustrates an example method of allocating resources. First, as step S601, measurements relating to links between a terminal and infrastructure nodes are obtained. For example, if the method is used in a V2X environment, the infrastructure nodes may be RSUs communicating with a terminal in a vehicle. The measurements may be any one or more suitable types of measurements which may be indicative of a received power in a band (e.g. RSSI or RSSI-like measurement), a received power from a node (e.g. RSRP or RSRP-like measurement), a signal-to-noise ratio or likewise (e.g. a RSRQ or RSRQ-like measurement) a link quality (e.g. CQI or CQI-like measurement) or any other measurement indicative of a power and/or quality of a link. Also, a measurement may be for carried out across an entire band to be used for communications, or across a larger or smaller band and, in some cases, it may additionally be normalised to a specific bandwidth, for example the bandwidth of a single sub-carrier in an LTE environment.

At step S602, direction information is obtained for the first terminal. The direction information may be obtained independently from the measurements, for example from a geo-localisation module associated with the terminal and/or vehicle. In this case, the method may also rely on a map associating the infrastructure nodes with a corresponding geo-localisation position which can assist in determining whether the direction of the terminal is towards or away from infrastructure nodes. Alternatively or additionally, the direction information may be obtained from the measurements. In some examples, direction information may be obtained at least in part from two or more measurement made at different times but for the same link. If the strength of the signal received from an infrastructure unit increases from a first point in time to a second point in time, it may be assumed or inferred that the vehicle/terminal is moving towards the infrastructure unit. Likewise, if the strength decreases, it may be assumed or inferred that the vehicle/terminal is moving away from the infrastructure unit.

At step S603, a candidate infrastructure node for the terminal may be determined based the measurements and direction information. A variety of conditions may be used when determining whether an infrastructure node may be a suitable candidate node. For example, one or more minimum thresholds may be required for the measurements and, from nodes meeting these one or more thresholds, candidates nodes may be those closest to the expected direction of travel of the terminal which can be derived from the direction information. For example, if a terminal moves away from an infrastructure node or does not move towards the infrastructure node enough (e.g. if it is considered that the terminal is more likely to be moving alongside the node rather than towards it, even if such movement may involve a period of getting closer to the node), this node may not be considered as a candidate node. On the other hand if a terminal moves towards an infrastructure node (either at all, or to a degree considered as sufficient), this node may then be considered as a suitable candidate node. In the example of FIG. 4, once the terminal has turned right at the intersection for RSU 9, it may be found that RSU 8 and RSU 6 may each meet the measurements requirements but also that the terminal is not moving towards RSU 8 but is moving towards RSU 6. As a result, RSU 6 can be selected as a candidate infrastructure node. In other words, based on the measurements and direction information, it is expected to be a suitable infrastructure node for the terminal to communicate with when trying to reduce communication delays caused by a poor RSU selection.

At S604, resources for the terminal to communicate with the candidate infrastructure node are allocated. The resources can be allocated in any suitable manner, thereby effectively allowing the terminal to communicate with the candidate infrastructure node. In the example of FIG. 6 or in other examples, the resource allocation may be communicated to the infrastructure node and/or terminal. In one example, the resource allocation information is transmitted to the infrastructure node which can then allocate the resources for the terminal and inform the terminal of the resources that have been allocated to it, for example in a part of the signals it is transmitted which can be used for signalling resource allocations to terminals or other nodes. In another example, both the infrastructure node and the terminal receive, from a base station for example, an indication of the resources allocated for them to communicate and they may then both use the resources as soon as technically possible to communicate with each other. Whichever technique is chosen for informing the terminal and infrastructure node of the resources that have been allocated, the two entities can then communicate and, in view of the candidate infrastructure node having been selected based on the direction information, the communications are less likely to suffer from delay resulting from an unsuitable node selection.

Also, in some examples, if resources were previously allocated for the terminal to communicate with another infrastructure node and if it is considered that these resources are no longer required, they can then be de-allocated. Like for the allocation of resources, the de-allocation of resources can be signalled to the terminal and/or the other infrastructure node as deemed appropriate. Whether resources need to be de-allocated can also be determined based on direction information and measurements and, in some cases, it may further be based on whether a candidate infrastructure node has been identified at S604. In one example, de-allocation of resources may be based on at least one of: measurements falling below one or more thresholds and the direction of the terminal being considered as being away from the infrastructure node (or as not being towards the infrastructure node). In another example, a terminal may only be communicating with one node and as soon as resources are allocated to an newly identified candidate infrastructure node, any resources previously allocated for communicating with another node may then automatically be de-allocated. In yet a further example, a combination of these may be implemented, with for example a terminal being allowed to communicate with up to N nodes (with N≥2) and, any time a new candidate is identified, it can be determined which nodes of the previous selection of infrastructure nodes may be kept or removed based on measurements and direction information. In other words, the de-allocation of resources may be based on the measurements and/or direction information for the terminal, and optionally, on any further suitable criteria.

Figure 7:
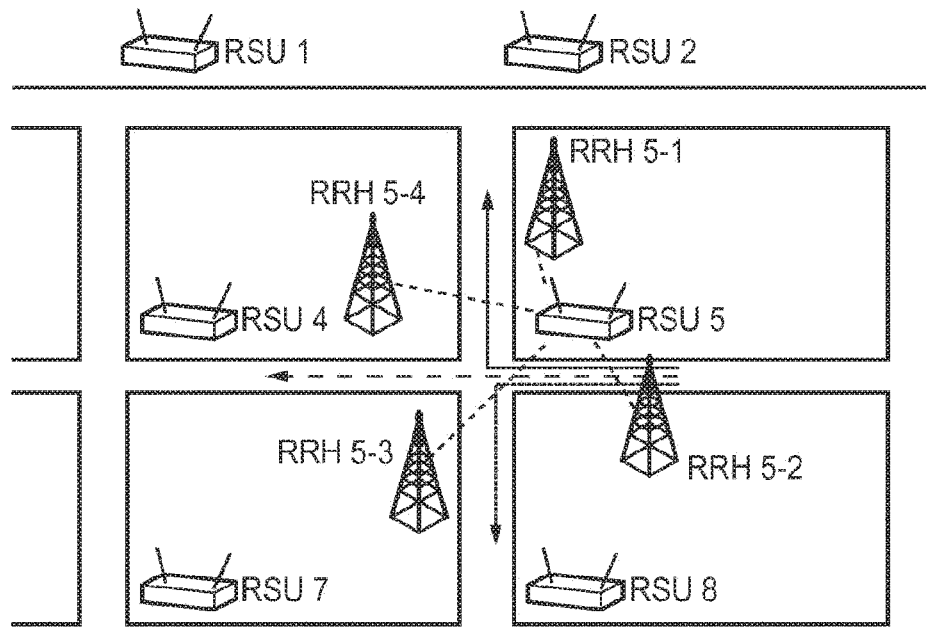
FIG. 7 illustrates an example RSU having a plurality of remote radio heads (RRH)

While in the previous example it has generally be assumed that measurements are carried out for a single link between a terminal and a base station, in other examples, measurements may be carried out for a plurality of links between the terminal and the base station, if for example the base station includes one, two or more Remote Radio Heads (RRH) or any other types of additional radio antenna. FIG. 7 illustrates an example RSU having a plurality of remote radio heads (RRH). In this example, RSU 5 is provided with four RRH, namely RRH 5-1, 5-2, 5-3 and 5-4, one for each of the branches of the intersection. Accordingly, the granularity of the measurements can be improved and more accurate direction information may be derived from measurements, in cases where it is at least in part derived from measurements. For example, in the event that direction information is derived from measurement information, the measurements with each of the base station and the RRH can potentially be used to try to obtain accurate direction information. For example, if it is detected that the power received from RRH 5-2 is strong but decreases while the power for RRH 5-1, 5-3 and 5-4 is less strong but increases, it may be assumed that the vehicle is in leading to the intersection for RSU 5, along any of the three arrows of FIG. 7. Then, the vehicle can still go in three different directions (ignoring a U-turn direction for the sake of simplification only) and the measurements from the RRH for RSU 5 can further help with estimating the direction of the vehicle:

- if it is detected that power received for RRH 5-1 increases, that power received for RRH 5-3 decreases, while power received for RRH 5-2 and 5-4 decrease in a similar manner, it may be assumed that the vehicle is going in the direction of the plain arrow;
- if it is detected that power received for RRH 5-4 increases, that power received for RRH 5-2 decreases, while power received for RRH 5-1 and 5-3 decrease in a similar manner, it may be assumed that the vehicle is going in the direction of the dashed arrow; and
- if it is detected that power received for RRH 5-3 increases, that power received for RRH 5-31 decreases, while power received for RRH 5-2 and 5-4 decrease in a similar manner, it may be assumed that the vehicle is going in the direction of the dotted arrow.

This information can be used in addition with measurements from other base station and/or RRH, if available, with a view to improve the accuracy of the direction information that can be derived from the measurement information.

The terminal may have two or more radio modules and may be able to use each independently to make measurements with the base station (with or without any RRH or equivalent). In some cases, if the position of the additional radio modules are known with respect to the vehicle's orientation (e.g. at a front or back position), direction information may already be derived from measurements made by the plurality of radio modules, with the measurement being carried out at substantially the same time, rather than subsequent measurements. While subsequent measurements may also be used, for example with a view to further improving the accuracy of the direction information, direction information may in this case be obtained from the substantially simultaneous measurements using two or more radio modules of the terminal which are spaced from each other. This may also be used in combination with making measurement for a base station provided with one or more RRH.

The direction information may be obtained using different techniques and, when it is at least in part derived from measurements, the direction information may be obtained by the terminal, infrastructure node (e.g. a road side unit in a V2X environment), a base station, or any other suitable element which may then have access to the measurements. While each of these nodes is suitable for deriving direction information from measurements, the base station or another element connected to the base station may in some example be used as these elements are likely to have higher computing capabilities compared to terminals or infrastructure unit and may therefore be able to carry out more complex calculations which in turn may improve the accuracy of the direction information. In other cases, it be found that it is preferable to estimate at least a first estimation of the direction information at the terminal or infrastructure node level such that the selection of where to carry out such a step can be decided based on specific considerations for each individual arrangement.

Figure 8:
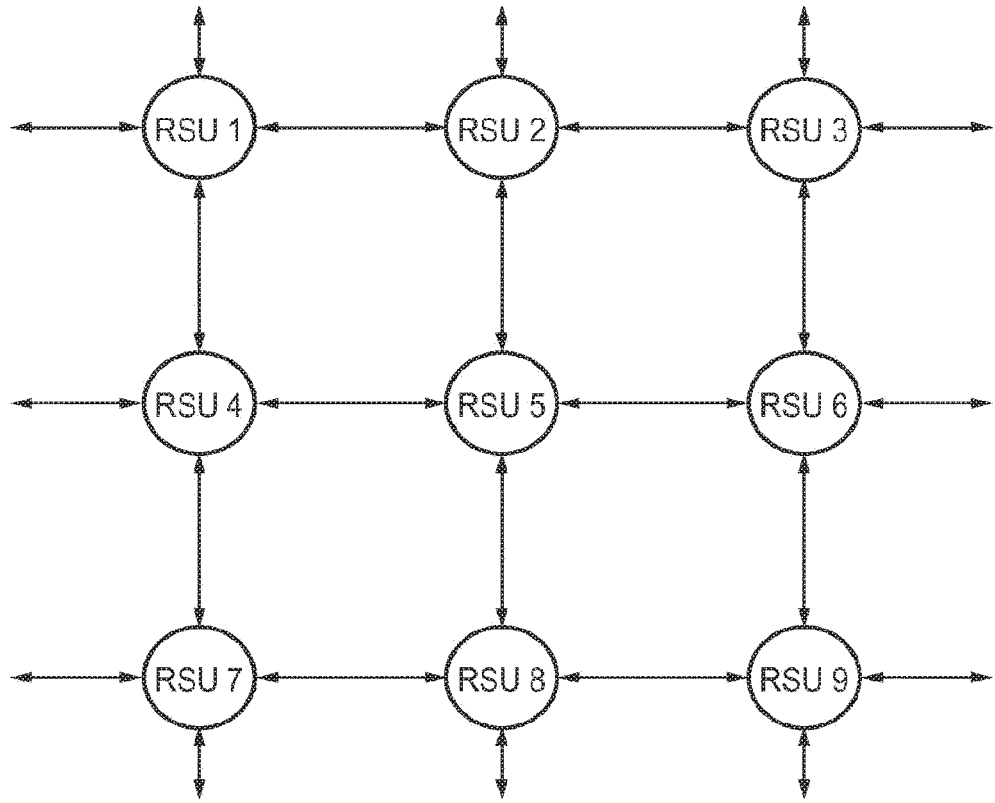
FIG. 8 illustrates an example graph representing a RSU network and routes between the RSUs.

When deriving direction information from measurements, the direction information may be derived based at least in part on, or using, a representation of the infrastructure nodes and of the connections between them, for example roads between intersections in the event that the infrastructure nodes are associated with an intersection. An example representation is a graph which can have infrastructure nodes as vertices and roads connecting the infrastructure nodes' locations as edges which can for example be unidirectional (e.g. one way roads) or bidirectional. FIG. 8 illustrates an example graph representing a RSU network and routes between the RSUs for an arrangement similar to that of FIG. 4. A vehicle or pedestrian in such an environment may follow routes which are represented by the edges. The use of such a mapping of the infrastructure nodes against a real-life environment illustrating the possible routes or paths for a vehicle can be useful for estimating the direction information from the measurements. If for example the changes in the measurements correspond to a pattern of change that would be expected if a vehicle follow the path RSU 7-RSU 8-RSU 5, then it is likely that this is the path that the vehicle is following.

Figure 9:
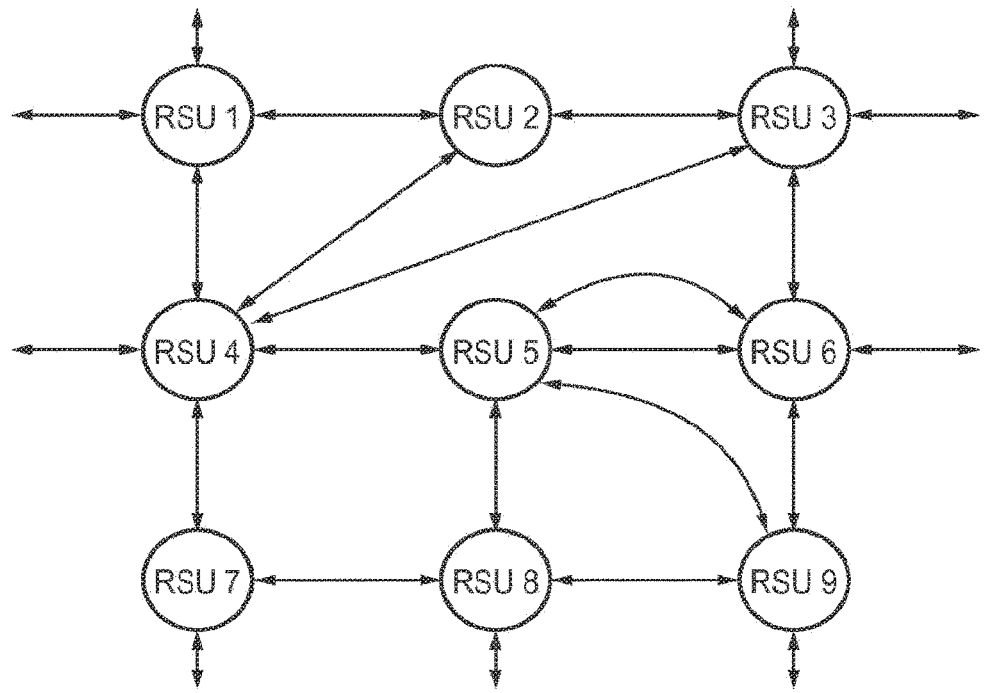
FIG. 9 illustrates another example graph representing a RSU network and routes between the RSUs.

While the graph of FIG. 8 illustrates a somewhat simplified environment, FIG. 9 illustrates another example graph representing a RSU network and routes between the RSUs which has a more complex structure than that of FIG. 8. For example, not all RSUs may be connected with a (geographically) neighbouring one, there may be unidirectional edges between two vertices, more than one edge can be provided between two vertices, an edge connecting two vertices but going very close to a further vertex it is not connected to, etc. Although FIG. 9 does not exhaustively covers all possible types of variations for graphs, it is useful in understanding that, by using a mapping technique for the infrastructure nodes and possible paths for the terminals, direction information may be obtained more accurately as it can effectively reduce the number of possible position and direction for the terminal from potentially "anywhere" and "any direction" to "on or near an path" (edge/vertex) and "along an edge". By reducing the number of possible positions and/or directions from which the expected direction of travel of the terminal can be derived, there can be achieved a significant reduction in the amount of processing required and a significant improvement in the accuracy of the direction information thereby obtained.

Additionally, direction information derived from measurements may be cross correlated with direction information obtained in any other way, for example using any of: a geolocation module associated with the terminal, using a detection signal from a fixed detector placed on a side of a road which can report which terminal is can detect in its vicinity, etc. Likewise, in some examples, direction information not derived from measurements is the primary source of direction information and it can in some instances also be cross-correlated (temporarily or permanently) with direction information obtained from measurements.

Figure 10:
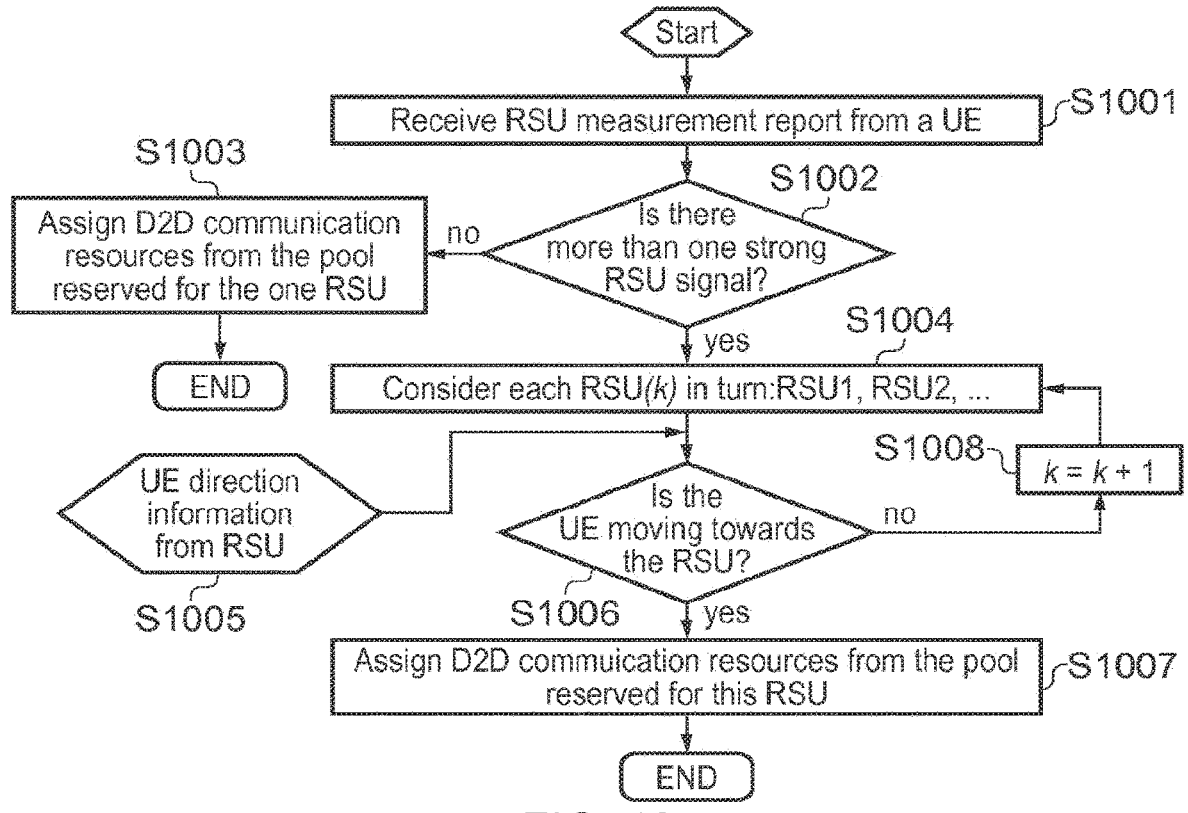
FIG. 10 illustrates another example method of allocating resources.

FIG. 10 illustrates another example method of allocating resources. In this example, a base station receives measurements from at least one terminal and also allocates the resources for the terminal to communicate with a candidate infrastructure node, wherein the terminal and infrastructure nodes are V2X-enabled and communicate using D2D or D2D-like communications. As the skilled person will understand, the teachings provided in respect of FIG. 10 and its discussion can also be applied to other type of environments or arrangements, in accordance with the present disclosure. At S1001, the base station receives one or more measurement reports from a terminal. Based on this, the base station determined at S1002 whether there is more than one RSU with a strong enough measurement. This may involve for example determining whether a power is above a threshold and/or a link quality meets a minimum requirements and/or any other criterion is met for each RSU in the measurements. In the event that no RSU can be detected with a strong enough signal, on the basis of the measurements, the can stop (and in some example it can also de-allocate any resources previously allocated to the terminal. If only one RSU is detected with a strong enough signal, the method can move on to S1003 where D2D resources are allocated to the terminal and identified RSU, for them to communicate, and the method can then end. In this case, relying on direction information may not be efficient as it is unlikely to have any effect on the resource allocation as the terminal would not be likely to be able to communicate with any other RSU.

On the other hand, if two or more RSUs are detected with a strong enough signal, it may then become more important to select the RSU which is likely to reduce delay the most and direction information may then be used to assist with this selection. In the example of FIG. 10, the base station considers each of the RSUs in turn (S1004). For each relevant RSU, the base station can take into account the terminal direction information (S1005) that has been received from the RSUs in this example, to determine whether the terminal is moving towards the RSU or not (S1006). If the terminal is not moving towards the RSU, the method considers the next RSU, if any, (S1008) and returns to S1004 previously discussed. If however the terminal is moving towards the RSU, the base station can then assign D2D resources for the terminal and this candidate RSU to communicate (S1007), the resources being for example selected from the pool of D2D resources for this RSU. The method can then end. As a result, the terminal is only allocated resources to candidate RSU which are more likely to be the most or one of the most relevant RSUs for this terminal, thereby improving with the delay reduction.

Alternative RSU or infrastructure node selection may also be carried out. For example, in another arrangement, a score can be calculated for each RSU based on an indication of how much the terminal moves towards the RSU. For example, a terminal moving in the opposite direction from the RSU may be given a score of 0 and may be given 1 if moving directly towards the RSU for scores varying from 0-1 (e.g. in a linear or non-linear manner). In other examples, the same situations may attract scores of −1 and 1, respectively, while moving in a direction substantially perpendicular to these two directions would attract a score of 0. Then, the RSU with the highest score may be selected as probably the most relevant one and resources may be allocated for the terminal to communicate with this terminal. The scores based on direction information may also be weighted based on any relevant weight, for example based on the measurements (with closer infrastructure nodes being give a weight which increases the likelihood of the node being selected) and/or on whether the RSU already has resources allocated for communications with the terminal (e.g. to avoid an early disconnection from a current RSU in some cases) to generate the final score upon which the selection of the candidate infrastructure node can be made.

Figure 11:
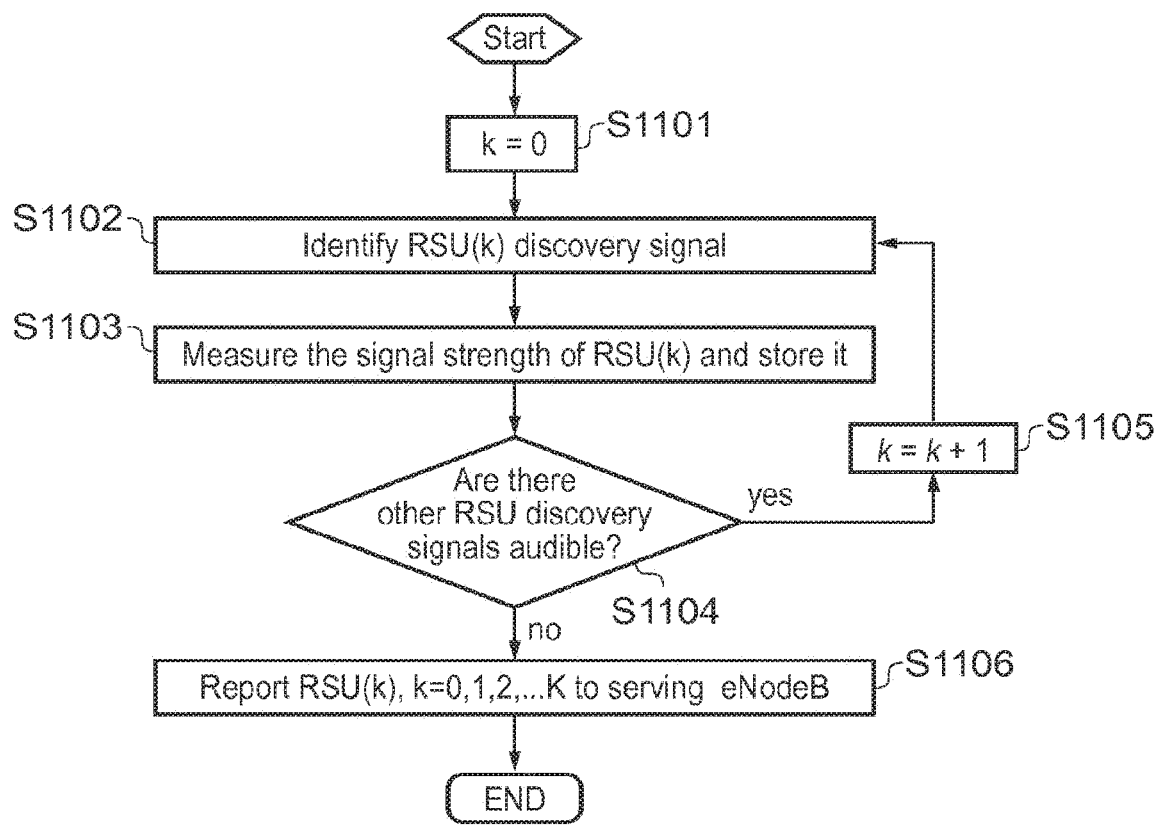
FIG. 11 illustrates an example method of a terminal reporting measurement information.

FIG. 11 illustrates an example method of a terminal reporting measurement information, or sending measurements reports, which may be used for selecting one or more candidate infrastructure nodes for allocating resources for the terminal. First, at S1101, the method is initialised and at S1102 the terminal detects a discovery signal from an infrastructure node (or RSU in this case) and if a discovery signal is detected, one or more measurements are carried out S1103 for this newly detected RSU. Then the terminal determines if any further infrastructure node can be detected at S1104. If another node can be detected, the terminal increases its counter (S1105) and returns to S1105. On the other hand, if no further infrastructure node can be detected or discovered, the terminal sends a measurement report to the base station. The measurement report can include one or more measurements for each of the infrastructure node that has been detected. While in this example the measurement report is sent once all infrastructure nodes have been detected and measured, in other examples the terminal may send a measurement report once N nodes have been detected and measured (N≥1) and/or once a timer T has expired so that the report can be sent once they have reached a certain size and/or if no report has been sent for a time period T.

In the example of FIG. 11, the terminal detects and measures a indicator of a link between the terminal and the infrastructure node (and/or between any additional radio unit of the base station such as an RRH). Alternatively or additionally, an infrastructure node may make measurement with on one or more terminals and report the measurements to the base station. In the case the base station includes one or more additional radio units, such as RRHs, the measurements may be for links between the terminal and any of the base station and the radio units.

Figure 12:
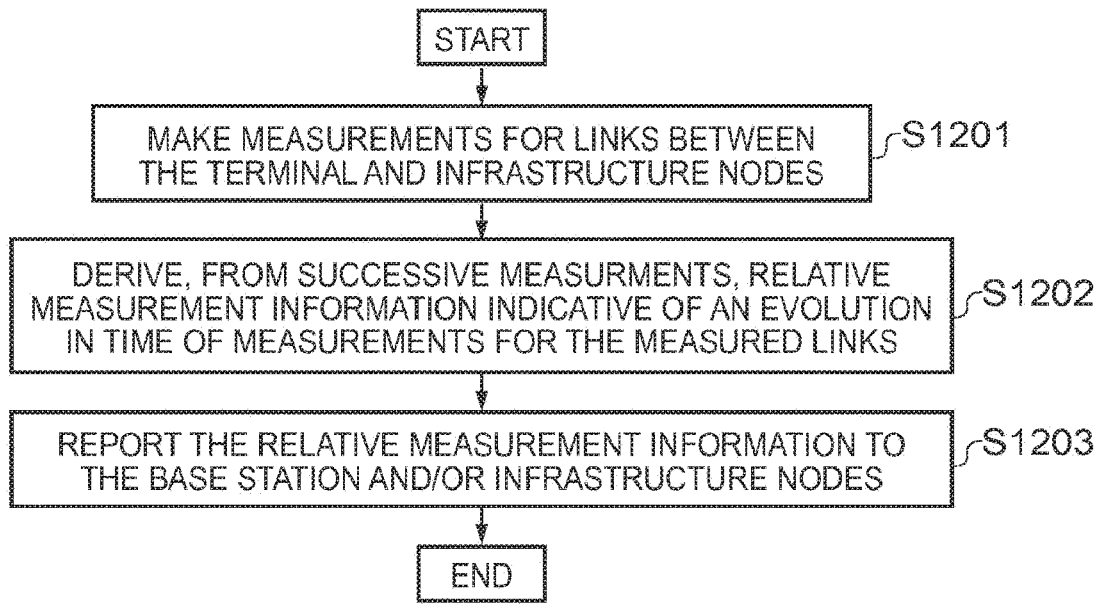
FIG. 12 illustrates another example method of a terminal reporting measurement information.

FIG. 12 illustrates another example method of a terminal reporting measurement information. In this example, relative measurement information is derived at the terminal and reported to the base station. The base station (or the relevant element) may make use of the relative measurement information to obtain direction information and thus to select one or more candidate infrastructure node for allocated resources for communicating with the terminal. First, at S1201 measurements are made for links between the terminal and one or more infrastructure nodes. Then, from successive measurements, relative measurement information indicative of an evolution in time of measurements for the measured links may be derived (S1202). For example, the terminal may compare a measured signal strength at a time T and at a later time T+t and identify that the signal strength has essentially increased, decreased or remained the same. The relative measurement information may in some case an qualitative indication of the evolution of the measurement (e.g. up, down or stable) while in other cases it may be a quantitative indication, such as numerical value indicating the amount of change, positive or negative, between the compared measurements. Finally, at S1203, the terminal may report the relative measurement information to the base station and/or infrastructure nodes. While the terminal may report relative measurements information only, in other cases the measurement information reported by the terminal may further comprise direct measurement information, for example measurement information directly based or comprising the measurements made for the links.

Accordingly, with a view to reducing delays in communications, one or more candidate infrastructure nodes may be selected for communicating with a terminal wherein, by using direction information for the terminal for the selection, it is expected that only relevant nodes will be selected for communicating with terminals, thereby reducing delay caused by a poor infrastructure node selection process.

Once it is has been decided which infrastructure nodes will communicate with which terminal, which may sometimes be referred to as a terminal (or terminals)-infrastructure node (or nodes) association in the interest of conciseness, the resources can be allocated to the terminals and infrastructure nodes accordingly.

Conventionally, the base station is in charge of D2D resource allocation. The base station is unaware of whether a terminal intends to use resources to communicate and therefore allocate resources upon receiving a request from the terminal. In one example, Rel'12 MAC specifications state that in order to transmit on the SL-SCH (SideLink Shared Channel) the MAC entity must have a sidelink grant. The term "sidelink" generally refers to direct communications from a D2D device to another D2D device (while uplink and downlink refer to communication with a base station in the conventional sense). The sidelink grant is selected as follows [2]:

if the MAC entity in the terminal is configured to receive a sidelink grant dynamically on the PDCCH or EPDCCH and more data is available in STCH than can be transmitted in the current SA period, the MAC entity shall using the received sidelink grant determine the set of subframes in which transmission of Sidelink Control Information and transmission of first transport block occur. The transmission under this sidelink grant may occur in subframes starting at the beginning of the first available SA Period which starts at least 4 subframes after the subframe in which the sidelink grant was received The configured sidelink grant is always cleared at the end of the corresponding SA Period.

Figure 14:
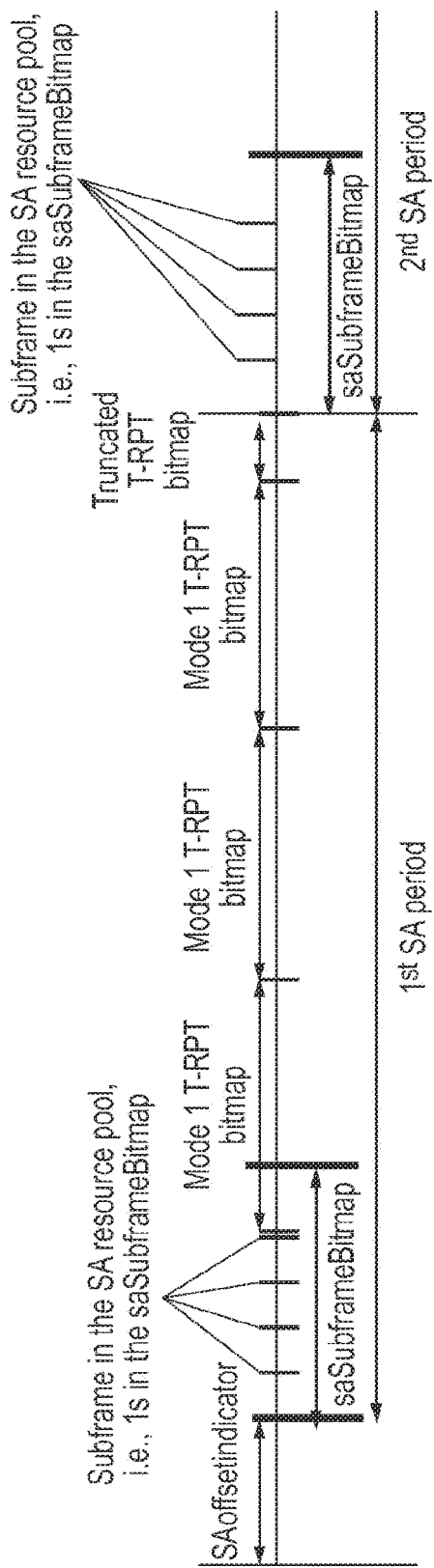
FIG. 14 illustrates an example of D2D resources allocation.

Accordingly, the terminal must request a new sidelink grant whenever it has data to send on the SL-SCH. In D2D, this mode of resource allocation is called "Mode 1". Accordingly, the use of resources may be optimised as the base station can avoid collision between simultaneous transmissions and even use frequency planning to reduce the risk of interferences while increasing the use of frequency resources. FIG. 14 illustrates an example of conventional D2D Sidelink resources assignment period. In this example, in a first SA (Scheduling Assignment) period, using resources available for sending scheduling assignments (e.g. on a physical sidelink shared channel "PSSCH"), the terminals indicate on the saSubframeBitmap which resources they use for transmission during the T-RPT occasions. The resources indicated and used by a terminal are those that were granted to it in response to a previous request for resources from the terminal. At the end of the SA period, the sidelink resource grant is cleared and the terminal must request a new grant if it has more data to be transmitted. It is noteworthy that in the latest MAC specification TS36.321 V12.5.0 [2] the SA period is referred to as SC (Sidelink Control) Period.

Alternatively, 3GPP specifications also describe a second mode of resource selection wherein the terminal selects resources from a D2D resource pool when they wish to transmit something. In this case the resources are randomly selected from a pool of resources configured by higher layers. This mode is called "Mode 2". While resources may be used straight away by the terminal, without any prior request and scheduling assignment exchange, there is also a risk of collision with transmissions from another terminal in view of the lack of any prior planning on which terminal (or other D2D node) will be using which resources. As a result, due to the risk of collisions, the risk of retransmissions is significantly higher compared to a mode 1 or convention mode for resource allocation and a resource allocation in a D2D-Mode 2 or the like is not suitable in environments where a low latency is required, e.g. in a V2X environment. Therefore, in this type of environments, a Mode 1 or Mode 1-like type of resource allocation has generally been preferred. However, in some example (such as in a D2D example), the cycle for allocating resource may be of 40 ms or more which, as discussed above, could result in a transmission needing potentially up to 80 ms (or more if the cycle is more than 40 ms) before it can be fully transmitted. This may not be acceptable in some low-delay environment.

It is hereby proposed to allocate the resources in a completely different manner, in a semi-persistent fashion, wherein resources are allocated for a terminal for a duration longer than a single SA Period. Semi-persistent allocation of resources means that the terminal has access to the resources across multiple SA periods (in some examples the same resources across the multiple allocation periods) without explicitly having to request and be assigned further resources. Until the resources are released, it is expected that one unique terminal is communicating across those resources with an infrastructure unit. The initiation of semi-persistent allocation may begin with a terminal requesting resources, or it may be initiated by the base station assigning resources to a terminal when it is considered that the terminal has to communicate with an infrastructure unit (i.e. in a spontaneous manner in the absence of a resource allocation request from the terminal). Due to latency considerations, the resource assignment and release may be signalled via physical layer control channels, but RRC signalling or any other suitable type of signalling may also be used. Accordingly, due to the reduced need for the terminal to request further resources before it can communicate over two or more allocation periods, the delay for the terminal to be able to communication, and thus the delay in the transmissions between the terminal and the infrastructure node can be reduced.

Figure 13:
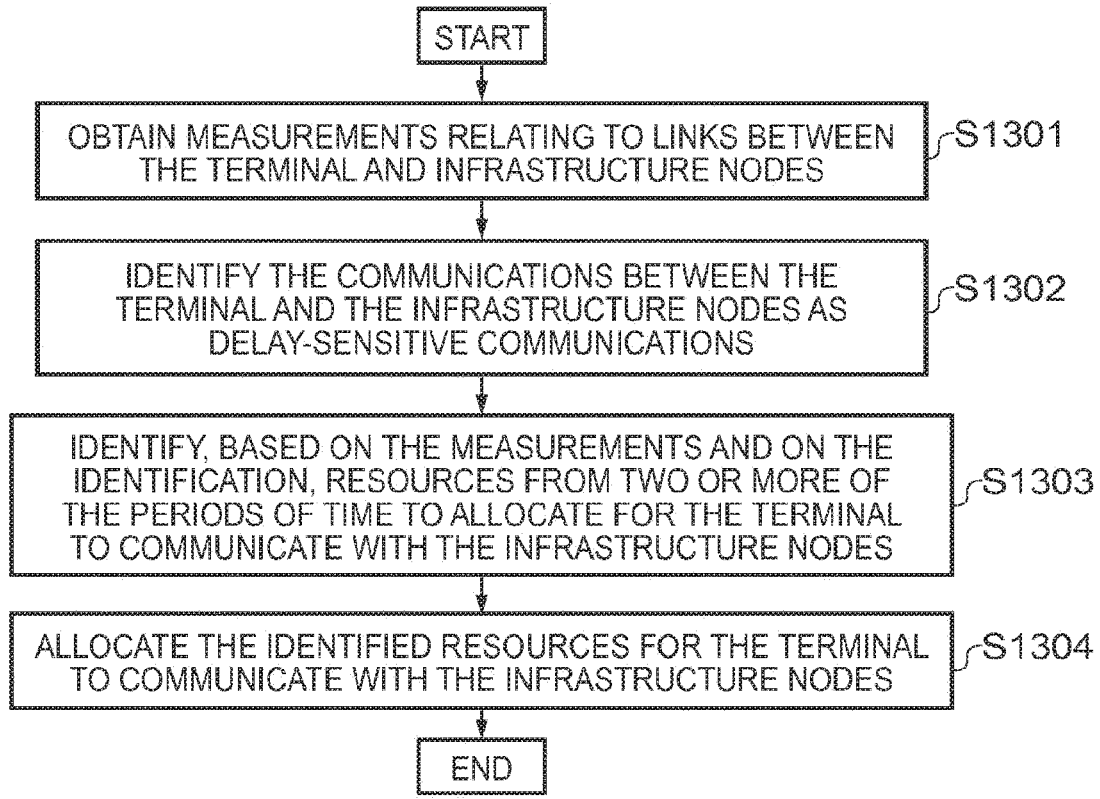
FIG. 13 illustrates an example of allocating resources to a terminal in the absence of a resource allocation request.

FIG. 13 illustrates an example of allocating resources to a terminal in the absence of a resource allocation request. First, at S1301, measurements are obtained, wherein the measurements relate to links between a terminal and infrastructure nodes. As previously mentioned, in cases where there could be one or a plurality of links between a terminal and an infrastructure node—for example depending on whether the terminal and/or infrastructure node comprises one or more additional radio elements (e.g. RRH). At S1302 the communications between the terminal and the infrastructure nodes are identified as delay-sensitive communications. This can be based for example on any of: the base station having a table of indicators of which terminals, infrastructure nodes and/or combinations thereof are expected to carry out delay-sensitive communications; on an indicator included in a resources allocation request (if used) from the terminal; on a look-up from a database of indicators for terminals, infrastructure nodes and/or combinations thereof; on any other suitable methods or means; or on any combination thereof.

The method then moves to step S1303 where resources to allocate for the terminal to communicate with the infrastructure node(s) are identified based on the measurements and on the previous identification of delay-sensitive communications to be carried out. Based on the resources identification, said resources can be allocated for the terminal to communicate with the infrastructure node(s) at S1304. For example, based on measurements, it can be determined (e.g. by a base station or other element) that the terminal is in the vicinity of an infrastructure node (e.g. a RSU) and is therefore likely to wish to communicate with it with delay-sensitive communications, for example for vehicle safety purposes. Rather than wait for a resource assignment request to allocate resources individually for each relevant period in turn, the resources can be allocated for two or more period so that they are already available in case they are needed by the terminal in the future. Accordingly, the delay for the terminal to communicate with one or more infrastructure nodes over two or more allocation periods can thereby be reduced as resources are pre-allocated for the terminal for this plurality of periods, before it is known whether they will be needed or not. While this goes against the conventions in mobile networks and is likely to reduce the efficiency of the network (in terms of resource usage), this can also reduce delays in the transmissions as the sidelink resources can be used by terminals very quickly within these periods (as the resources are already available to the terminal as soon as they are needed, if they are needed) whilst also avoiding the risk of collisions with transmissions from other terminals or nodes. Semi-persistent allocation of resources furthermore provides a terminal much faster access to the Physical Sidelink Shared Channel. For example, while D2D transmissions based on existing Mode 1 or Mode 2 may have an SA cycle of 40 ms or more, a terminal may access the semi-persistently assigned resources at any T-RPT instance. Accordingly, the delay from the terminal wishing to transmit data and actually transmitting data over this longer period can be significantly reduced. In some examples, as soon as the terminal is in the vicinity of an infrastructure nodes, resources can be allocated to the terminal in the absence of a resource allocation request from the terminal. In this case, rather than having to send a request and wait for the assignment in return, the terminal will receive an assignment straightaway, thereby further reducing the delay for the terminal to be able to communicate compared to a conventional resource allocation arrangement.

Figure 15:
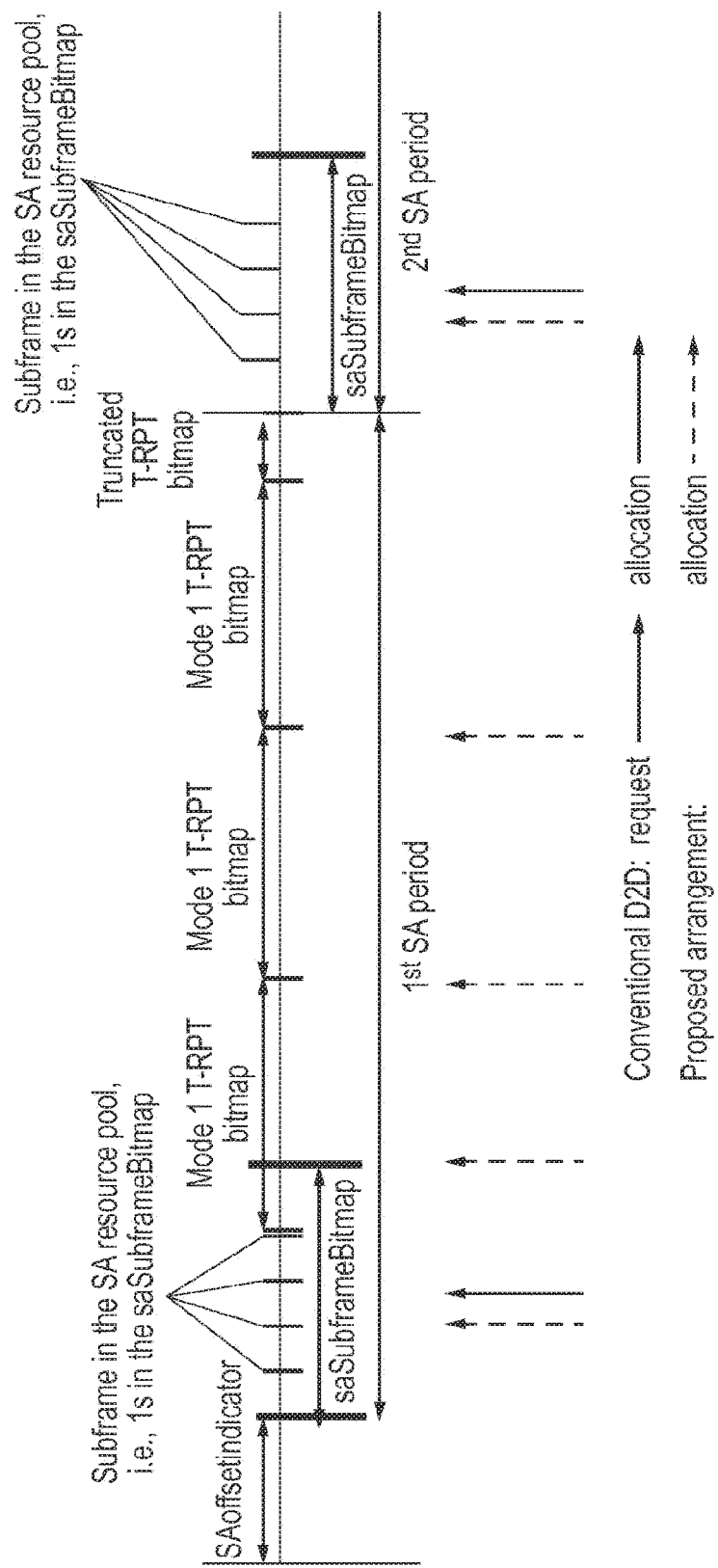
FIG. 15 illustrates an example comparison of a D2D resources allocation with a resource allocation in accordance with the present disclosure.

FIG. 15 illustrates an example comparison of a D2D resources allocation with a resource allocation in accordance with the present disclosure and can be useful when compared with for example the illustration of FIG. 14. The plain arrow illustrates when the resources for a conventional D2D terminal will be allocated (the scheduling assignment being only received after the terminal has successfully transmitted a resources allocation request to the base station—see the double-lined arrow) whereas the dotted arrow illustrate when the terminal can access a transmission resource provided by the semi-persistent scheduling assignment in accordance with the present disclosure. Accordingly, the delay for the terminal to be in a position to start communicating with the one or more infrastructure nodes (for receiving and/or sending transmissions) can be significantly reduced and the resulting arrangement is thus more likely to be suitable for low-delay environments, such as V2X environments.

Figure 16:
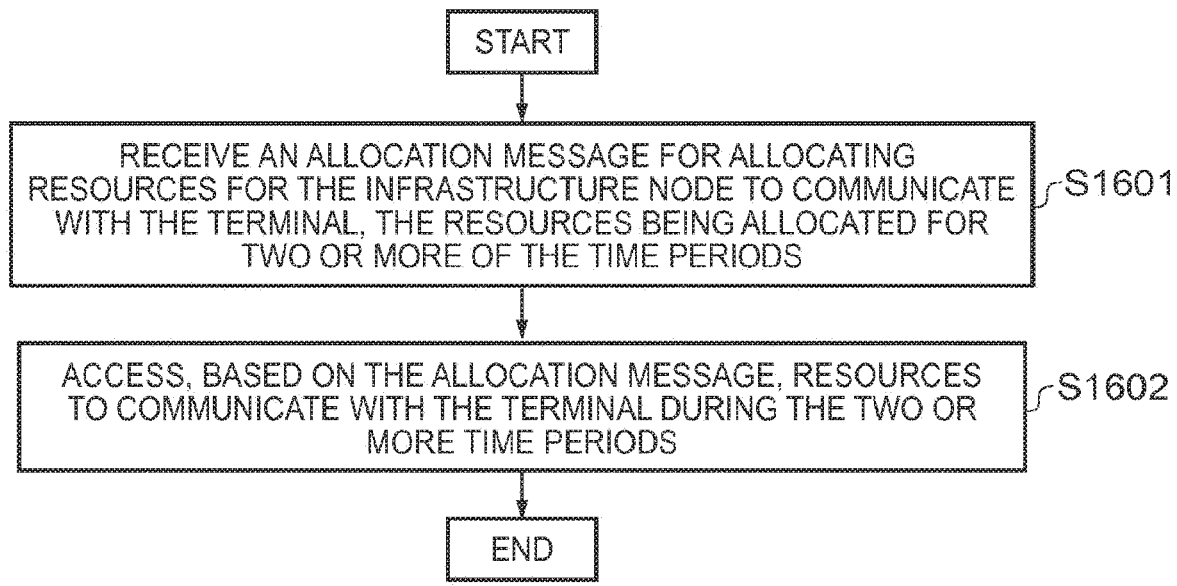
FIG. 16 illustrates an example method of allocating resources at an infrastructure unit in the absence of a resource allocation request from the terminal.

FIG. 16 illustrates an example method of allocating resources at an infrastructure unit, which can be carried out with an allocation request from the terminal or in the absence of a resource allocation request from the terminal. At S1601, the infrastructure node receives an allocation message for allocating resources for the infrastructure node to communicate with the terminal, wherein the resources are for two or more allocation periods. Based on the allocation message, the infrastructure node can then access the allocated resources to communicate with the terminal during the two or more allocation periods (S1602). The infrastructure node can accordingly communicate with the terminal using the resources identified in the allocation message (e.g. a scheduling assignment) without the terminal having to request the resources for each of the allocation period. In some examples the terminal will receive an indication of the allocated resources, for example from the base station and/or from the infrastructure node, such that each of the terminal and infrastructure node are aware of which resources to use for sending signals and which resources to listen to for receiving signals. Accordingly, resources can be allocated at an infrastructure node to communicate with a terminal in a manner which reduces delays in the transmissions between the infrastructure node and terminal.

Figure 17:
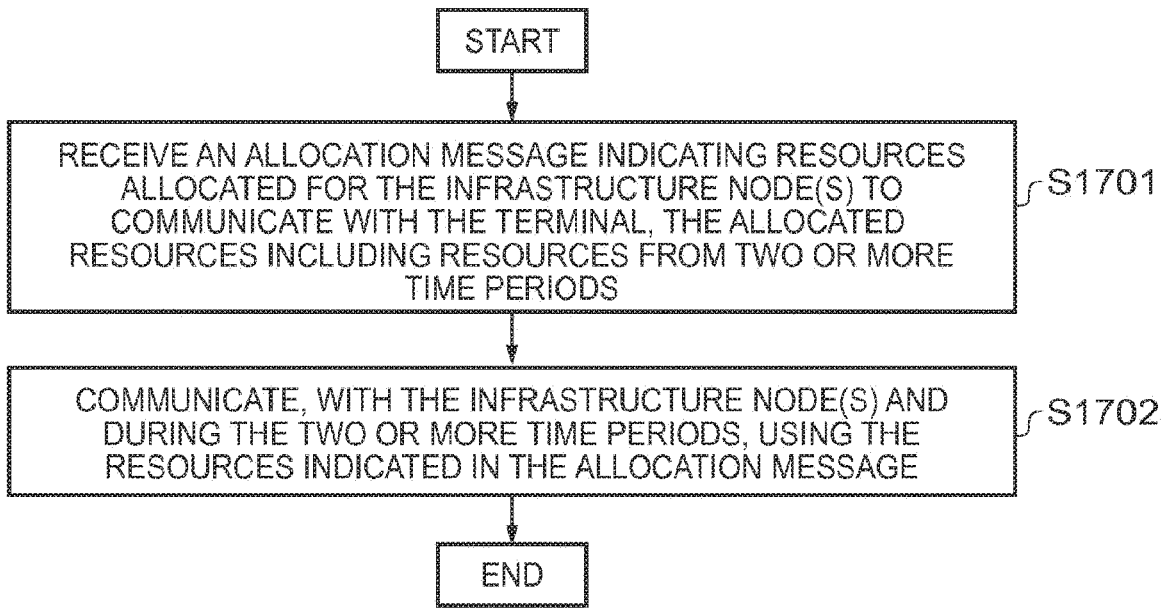
FIG. 17 illustrates an example method of communicating between a terminal and one or more infrastructure nodes in the absence of resource allocation request from the terminal.

In some examples, the method may also comprise obtaining measurements relating to a link between the terminal and the infrastructure node. In this example the measurements can be obtained either by the infrastructure node making its own measurements and/or by receiving measurements from a terminal. The measurements are then transmitted to the base station for allocating resources. and FIG. 17 illustrates an example method of communicating between a terminal and one or more infrastructure nodes which can be carried out with an allocation request from the terminal or in the absence of resource allocation request from the terminal. the terminal receives at S1701 an allocation message indicating resources allocated for the infrastructure node(s) to communicate with the terminal, the allocated resources including resources from two or more allocation time periods. As discussed above, the allocation message may be received in any suitable form. In some examples it will received from the base station and/or infrastructure node. It may also be received via a dedicated channel and/or dedicated timeslots within a channel or frequency band. The terminal is then able to communicate with the infrastructure node(s) during the two or more allocation time periods using the resources indicated in the allocation message (S1702). Accordingly, the delay for the terminal to be able to communicate with the infrastructure node for a plurality of allocation periods can thereby be reduced.

In some examples, the method may also comprise the terminal obtaining measurements relating to a link between the terminal and one or more infrastructure nodes and, then, the terminal transmitting the measurements to the base station and/or the infrastructure node(s) for allocating resources.

Figure 18:
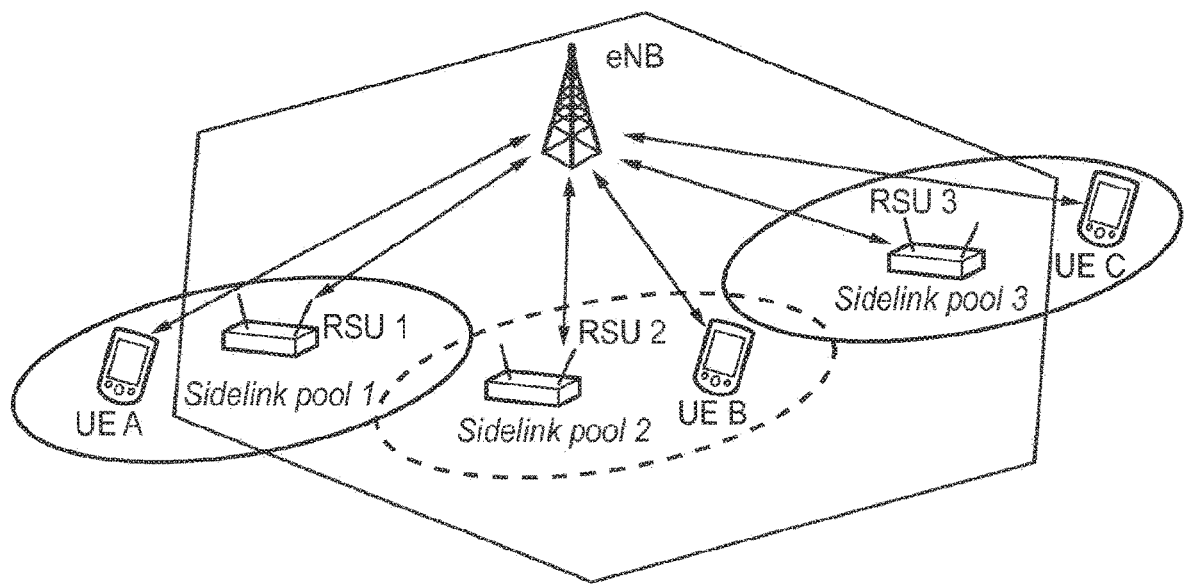
FIG. 18 illustrates an example network with three RSUs and resources allocated to each RSU for communications with the terminals.

Accordingly, there has been provided an arrangement where the allocation of the resources has been sped up thereby reducing delay in transmissions which can be used with a view to improving a compliance with a low latency system (e.g. a V2X system). While the resources allocation delay can thereby be reduced, the resources are still used in an "allocated" mode (which differs from example from a D2D-mode 2 allocation mode) and the resource utilisation can thus be controlled. While resources may be allocated that will not be needed by the terminal (thereby reducing the utilisation efficiency for the network), the resources can still be allocated such that the same resources are allocated to different terminal(s)/infrastructure node(s) associations which are in different areas. For example, FIG. 18 illustrates an example network with three RSUs and resources allocated to each RSU for communications with the terminals. In this example, as the RSU 1 and RSU 3 are remote from each other, depending on their range, they may be allocated resources from the same resource pool. In other words, there may be a partial or complete overlap in frequency and/or time between the sidelink pool 1 and the sidelink pool 3 wherein the resources can be allocated base the eNB (base station). On the other hand, at there is a (geographical) overlap between the transmissions from RSU 1 and RSU 2 and between the transmissions from RSU 2 and RSU 3, overlap (in frequency and/or time) in resources from sidelink pools 1 and 2 and sidelink pools 2 and 3 may be avoided and reduced with a view to reducing interferences or collisions. Accordingly, it can be attempted to compensate, at least in part, for some of the reduced efficiency in resource utilisation that result from the spontaneous resource allocation of the present disclosure by improving the selection of resources allocated for the infrastructure nodes with a view to increase re-use of the same resources while avoiding collisions.

Figure 19:
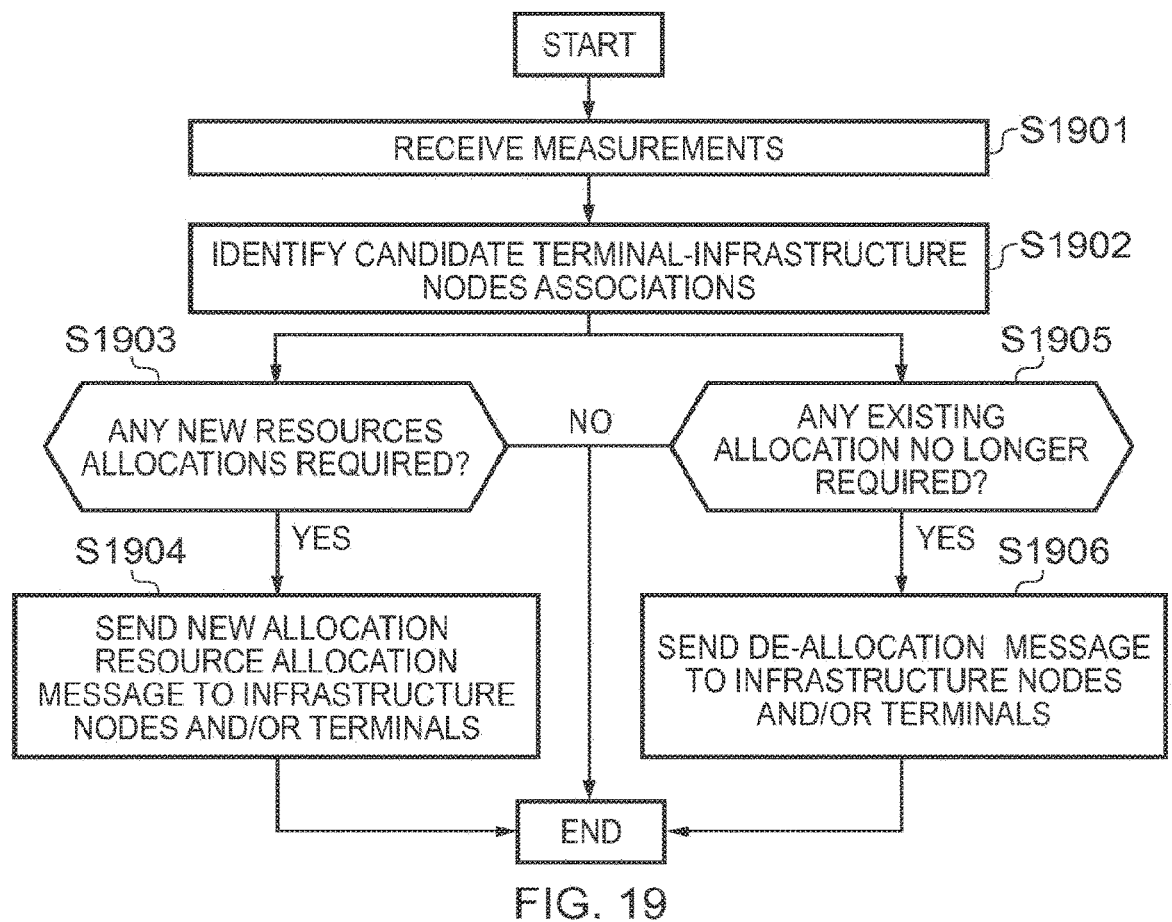
FIG. 19 illustrates an example method of allocating and de-allocating resources in the absence of a resource allocation requests from terminals.

While the discussions above have been mainly focussing on semi-persistent allocation of resources, de-allocation or release of allocated resources can also be managed autonomously by the base station (or another element) using measurements from terminals and/or infrastructure nodes without any request from the terminals or infrastructure nodes. FIG. 19 illustrates an example method of allocating and de-allocating (releasing) resources, in this case using the example the allocation in the absence of a resource allocation requests from terminals (but the same teachings apply for cases where resources are allocated for two or more allocation periods in response to an allocation request from the terminal). First, at S1901, measurements are received for example from one or more terminals and/or one or more infrastructure nodes. Based on the measurements, one or more candidate terminal(s)-infrastructure node(s) associations may be identified (S1902). These associations can be identified with or without the use of direction information for the terminals. Then, it can be determined whether any new resources allocations are required (S1903). If for example the associations do not include any new terminal-infrastructure node association and/or if current associations have already resources allocated for their communications, there may not be a need for any new resource allocation. In this case, the method can end (or return to S1901 to process any next measurements). On the other hand, if resource allocations are deemed appropriate at S1903, the method moves to S1904 where resources are allocated to the relevant associations and are communicated to the terminals and/or infrastructure for any such associations. From S1902, it can also be determined whether any existing allocation is no longer required (S1905). For example, a terminal and infrastructure node may have previously been allocated resources for communicating but their association may also have been found no longer appropriate at S1902 on the basis of the new measurements (e.g. if the terminal is moving away from the infrastructure node). In this case, the method can move to S1906 where a deallocation message may be sent to the infrastructure nodes and/or terminals. Alternatively, the terminal may request de-allocation if it considers that it no longer needs to communicate with an infrastructure node. If however no de-allocation is deemed required at S1905, the method can end (or return to S1901 to process any next measurements). While the steps S1903-S1904 and S1905-S1906 have been represented in parallel in FIG. 19, in other example they may carried out in a different order. For example, they may carried out in a sequence in any suitable order for the four steps.

In some cases, an allocation message received at S1904 may also be considered as a de-allocation message for the purpose of the step S1906. For example, if a first set of resources was previously allocated for a first terminal to communicate with a first infrastructure node and a new allocation message is sent that allocation the first set of resources for a second terminal to communicate with the first infrastructure node, the first terminal and/or first infrastructure node can also interpret this message as a de-allocation of the resources for the first terminal-first infrastructure node association. In such an example, each terminal may have to read all allocation messages for all terminals to identify when this situation occurs. In other examples, depending on the how the allocation and/or de-allocation messages are identified and read by the terminal in accordance with the allocation protocol used, it may be considered preferable for each terminal to only read its own allocation messages. In this case, the de-allocation messages would be accordingly sent to the individual terminals rather than relying on the terminal detecting that its previously allocated resources have now been re-allocated to a different terminal. Also, some messages may be comprise both allocation and de-allocation information thereby being used as both allocation and de-allocation messages.

Accordingly, there has been provided methods, systems, base stations, terminals and infrastructure nodes which can reduce delays in transmissions by using direction information for selecting infrastructure nodes for communicating with terminals and/or by allocating resources for the infrastructure nodes and terminals to communicate, in the absence of resources allocation queries from terminals. Accordingly, the suitability of such methods, systems, base stations, terminals and infrastructure nodes for low-delay and low-latency environments can be improved.

While the present disclosure has generally been presented in the context of V2X or V2X-like environments with RSUs being an example of infrastructure nodes, the teachings of the present disclosure are not limited to such environment and may be used in any other environment where the infrastructure nodes and/or terminals may for example not be V2X-enabled. Also, whenever a reference is made to a V2X-enabled unit or node or a V2X environment, a V2X technology should be understood and combination of one or more of: V2V, V2I, V2P, V2H or any other type of vehicle-to-something technology and is not limited to the any currently existing standards.

Also, many of the examples above have been illustrated with a terminal associated with a vehicle however the same teachings apply to a terminal which is not associated with any particular object or person, or associated with a pedestrian, a bicycle, a building or any other suitable object or person. In the case of an object, the terminal may be embedded in the object (e.g. a vehicle may comprise a mobile terminal in which a SIM card can be inserted), may be associated or paired with the object (e.g. a terminal may set up a Bluetooth connection with a Bluetooth module of the vehicle) or may simply be placed in a position wherein it is travelling with the object without having any particular communicative connection with the object (e.g. in the pocket of a driver or passenger in a vehicle).

Also, in the method discussed above, in particular the methods discussed in respect of FIG. 6 or 13, the steps may be carried by one or more entities and by any relevant entities. In some example implementation, some of the steps may be carried out by a terminal and/or infrastructure nodes while other steps may be carried out by a base station or yet another element. In other examples, all steps may be carried out by the same entity, for example the base station. As an illustration, in examples where direction information for a terminal is used for allocating resources, the direction information can be obtained by an element and transmitted to another one doing the allocation. For example, it may be obtained by the terminal and/or infrastructure node and may be used by a base station centralising resource allocation for one or more infrastructure nodes. In this example, the terminal and/or infrastructure elements may transmit or communicate the direction information to the base station for use in the resource allocation.

Additionally, the method steps discussed herein may be carried out in any suitable order. For example, steps may be carried out in an order which differs from an order used in the examples discussed above or from an order used anywhere else for listing steps (e.g. in the claims), whenever possible or appropriate. Thus, in some cases, some steps may be carried out in a different order, or simultaneously or in the same order. For example, and as previously mentioned, the de-allocation of resources may be carried out before, after or while the allocation of resources is carried out. Also obtaining measurements, obtaining direction information and identifying (at least) one candidate infrastructure node may be carried out in a different order and/or simultaneously. For example, the measurements may be obtained first and used for making a first infrastructure pre-selection, then direction information may be obtain to the select the candidate infrastructure node(s). In other examples, the direction information and measurements may be obtained in parallel and the candidate infrastructure node selection may be carried out afterwards.

As used herein, transmitting information or a message to an element may involve sending one or more messages to the element and may involve sending part of the information separately from the rest of the information. The number of "messages" involved may also vary depending on the layer or granularity considered.

Also, whenever an aspect is disclosed in respect of an apparatus or system, the teachings are also disclosed for the corresponding method. Likewise, whenever an aspect is disclosed in respect of a method, the teachings are also disclosed for any suitable corresponding apparatus or system.

Whenever the expressions "greater than" or "smaller than" or equivalent are used herein, it is intended that they discloses both alternatives "and equal to" and "and not equal to" unless one alternative is expressly excluded.

It is noteworthy that even though the present disclosure has been discussed in the context of LTE and/or D2D, its teachings are applicable to but not limited to LTE or to other 3GPP standards. In particular, even though the terminology used herein is generally the same or similar to that of the LTE standards, the teachings are not limited to the present version of LTE and could apply equally to any appropriate arrangement not based on LTE and/or compliant with any other future version of an LTE or 3GPP or other standard.

Various further aspects and features of the present technique are defined in the appended claims. Various modifications may be made to the embodiments hereinbefore described within the scope of the appended claims. For example although LTE has been presented as an example application, it will be appreciated that other mobile communications systems can be used for which the present technique can be used.

The following numbered clauses define various further aspects and features of the present technique:

Clause 1. A method of allocating resources in a mobile telecommunications system, the system comprising a base station configured to communicate via a wireless interface with one or more terminals and one or more infrastructure nodes configured to communicate via the wireless interface with the one or more terminals, wherein resources of the wireless interface are allocated for successive periods of time, the method comprising:

obtaining measurements wherein a measurement relates to a link between a first terminal of the one or more terminals and one of the one or more infrastructure nodes;

identifying the communications between the first terminal and the one or more infrastructure nodes as delay-sensitive communications;

identifying, based on the obtained measurements and on an identification of the communications between the first terminal and the one or more infrastructure nodes as delay-sensitive communications, resources to allocate for the first terminal to communicate with one or more of the infrastructure nodes wherein the identified resources are selected from two or more of the periods of time; and allocating the identified resources for the first terminal to communicate with the one or more of the infrastructure nodes during the two or more periods of time.

Clause 2. A method according to clause 1, wherein a second terminal of the one or more terminal is configured to request resources by sending a resource allocation request and wherein the method further comprises:

receiving a resource allocation request from the second terminal;

identifying the communications between the second terminal and the one or more infrastructure nodes as non-delay-sensitive communications or as legacy communications;

identifying, based an identification of the communications between the second terminal and the one or more infrastructure nodes as non-delay-sensitive communications or as legacy communications, other resources to allocate for the second terminal to communicate with one or more of the infrastructure nodes wherein the identified other resources are selected from a single period of time;

allocating the identified other resources for the second terminal to communicate with the one or more of the infrastructure nodes during the single period of time.

Clause 3. A method according to any preceding clause, wherein the time period is at least one of: a scheduling assignment period; a radio frame; a number of radio frames; a sub-frame; and a number of radio sub-frame.

Clause 4. A method according to any preceding clause wherein a measurement comprises relative measurement information for a link between the first terminal and the one of the one or more infrastructure nodes, the relative measurement information being indicative of an evolution in time of measurements for the link between the first terminal and the one of the one or more infrastructure nodes.

Clause 5. A method according to any preceding clause wherein identifying resources comprises identifying resources in the absence of a resource allocation request from the first terminal.

Clause 6. A method according to any preceding clause wherein identifying the communications between the first terminal and the one or more infrastructure nodes as delay-sensitive communications comprises obtaining one or both of: a delay-sensitive terminal indicator associated with the first terminal; a delay-sensitive infrastructure node indicator associated with the one or more infrastructure nodes and identifying the communications as delay sensitive communication based on the obtained one or both of the delay-sensitive terminal indicator and the delay-sensitive infrastructure node indicator.

Clause 7. A method according to clause 6 wherein obtaining one or both of the delay-sensitive terminal indicator and delay-sensitive infrastructure node indicator comprises at least one of:

receiving a delay-sensitive terminal indicator from the first terminal;

receiving a delay-sensitive infrastructure node indicator from the one or more infrastructure nodes;

requesting a delay sensitive terminal indicator from a network element; and requesting a delay sensitive infrastructure node indicator from a network element.

Clause 8. A method according to any preceding clause wherein allocating resources for the first terminal comprises sending an resource allocation message to the first terminal and/or to the one of the one or more infrastructure nodes.

Clause 9. A method according to any preceding clause further comprising:

de-allocating resources previously allocated for the first terminal to communicate with an infrastructure node other than the one of the one or more infrastructure nodes.

Clause 10. A method according to clause 9 wherein de-allocating resources previously allocated for the first terminal comprises sending a resource de-allocation message to the first terminal and/or to the infrastructure node other than the candidate infrastructure node.

Clause 11. A method according to any preceding clause wherein the method comprises the first terminal communicating with the one or more of the infrastructure nodes, during the two or more periods of time, using the identified and allocated resources.

Clause 12. A method according to any preceding clause wherein the one or more infrastructure nodes are configured to communicate with the one or more terminals according to a vehicle-to-everything "V2X" technology and, optionally, according to a vehicle-to-infrastructure "V2I" technology.

Clause 13. A method according to any preceding clause wherein the one or more infrastructure nodes are configured to communicate with the one or more terminals according to a device-to-device "D2D" protocol or set of protocols and, optionally, according to a 3GPP D2D protocol or set of protocols.

Clause 14. A base station for use in a mobile telecommunications system, the base station configured to communicate via a wireless interface with one or more terminals of the system, the system comprising one or more infrastructure nodes configured to communicate with the one or more terminals via the wireless interface, wherein resources of the wireless interface are allocated for successive periods of time and wherein the base station is further configured to:

obtain measurements wherein a measurement relates to a link between a first terminal of the one or more terminals and one of the one or more infrastructure nodes;

identify the communications between the first terminal and the one or more infrastructure nodes as delay-sensitive communications;

identify, based on the obtained measurements and on an identification of the communications between the first terminal and the one or more infrastructure nodes as delay-sensitive communications, resources to allocate for the first terminal to communicate with one or more of the infrastructure nodes wherein the identified resources are selected from two or more of the periods of time; and allocate the identified resources for the first terminal to communicate with the one or more of the infrastructure nodes during the two or more periods of time.

Clause 15. Circuitry for a base station for use in a mobile telecommunications system, the base station configured to communicate via a wireless interface with one or more terminals of the system, the system comprising one or more infrastructure nodes configured to communicate with the one or more terminals via the wireless interface, wherein resources of the wireless interface are allocated for successive periods of time and wherein the circuitry comprises a controller element and a transceiver element configured to operate together to obtain measurements wherein a measurement relates to a link between a first terminal of the one or more terminals and one of the one or more infrastructure nodes;

identify the communications between the first terminal and the one or more infrastructure nodes as delay-sensitive communications;

identify, based on the obtained measurements and on an identification of the communications between the first terminal and the one or more infrastructure nodes as delay-sensitive communications, resources to allocate for the first terminal to communicate with one or more of the infrastructure nodes wherein the identified resources are selected from two or more of the periods of time; and allocate the identified resources for the first terminal to communicate with the one or more of the infrastructure nodes during the two or more periods of time.

Clause 16. An infrastructure node for use in a mobile telecommunications system, the system comprising a base station configured to communicate via a wireless interface with one or more terminals, wherein resources of the wireless interface are allocated for successive periods of time, the infrastructure node being configured to communicate with the one or more terminals via the wireless interface and being further configured to:

receive an allocation message for allocating resources for the infrastructure node to communicate with the first terminal wherein the resources to be allocated are selected from two or more of the periods of time; and access, based on the allocation message, resources to communicate with the first terminal during the two or more periods of time.

Clause 17. An infrastructure node according to clause 16, wherein the infrastructure node is configured to:

obtain measurements wherein a measurement relates to a link between a first terminal of the one or more terminals and the infrastructure node; and transmit the obtained measurements to the base station.

Clause 18. Circuitry for an infrastructure node for use in a mobile telecommunications system, the system comprising a base station configured to communicate via a wireless interface with one or more terminals, wherein resources of the wireless interface are allocated for successive periods of time, wherein the circuitry comprises a controller element and a transceiver element configured to operate together to communicate with the one or more terminals via the wireless interface and being further configured to:

receive an allocation message for allocating resources for the infrastructure node to communicate with the first terminal wherein the resources to be allocated are selected from two or more of the periods of time; and access, based on the allocation message, resources to communicate with the first terminal during the two or more periods of time.

Clause 19. A terminal for use in a mobile telecommunications system, the system comprising a base station configured to communicate via a wireless interface with the terminal and one or more infrastructure nodes configured to communicate with the terminal via the wireless interface, wherein resources of the wireless interface are allocated for successive periods of time, the terminal being configured to:

receive an allocation message indicating resources allocated for one of the one or more infrastructure nodes to communicate with the terminal wherein the allocated resources are selected from two or more of the periods of time; and communicate, with the one of the one or more infrastructure nodes, using the resources indicated in the allocation message during the two or more periods of time.

Clause 20. A terminal according to clause 19 wherein the terminal is configured to:

obtain measurements wherein a measurement relates to a link between the terminal and the infrastructure node; and transmit the obtained measurements to at least one of the base station and the one or more infrastructure nodes.

Clause 21. Circuitry for a terminal for use in a mobile telecommunications system, the system comprising a base station configured to communicate via a wireless interface with the terminal and one or more infrastructure nodes configured to communicate with the terminal via the wireless interface, wherein resources of the wireless interface are allocated for successive periods of time, wherein the circuitry comprises a controller element and a transceiver element configured to operate together to:

receive an allocation message indicating resources allocated for one of the one or more infrastructure nodes to communicate with the terminal wherein the allocated resources are selected from two or more of the periods of time; and communicate, with the one of the one or more infrastructure nodes, using the resources indicated in the allocation message during the two or more periods of time.

REFERENCES

[1] Holma H. and Toskala A., "LTE for UMTS OFDMA and SC-FDMA Based Radio Access", John Wiley & Sons Limited, January 2010.

[2] TS36.321 V12.5.0, " "Medium Access Control (MAC) Protocol Specification, 3GPP, March, 2015

The invention claimed is:

1. A base station for use in a mobile telecommunications system, the mobile telecommunications system comprising one or more infrastructure nodes configured to communicate with one or more terminals via a wireless interface, the base station comprising:
   circuitry configured to
      communicate via the wireless interface with the one or more terminals;
      obtain measurements, wherein a measurement relates to a link between a first terminal of the one or more terminals and a first infrastructure node of the one or more infrastructure nodes;
      obtain one or both of a delay-sensitive terminal indicator associated with the first terminal, and a delay-sensitive infrastructure node indicator associated with the first infrastructure node,
      identify communications between the first terminal and the first infrastructure node as delay-sensitive communications based on the obtained one or both of the delay-sensitive terminal indicator and the delay-sensitive infrastructure node indicator;
      identify, based on the measurements and a result of identifying the communications as the delay-sensitive communications, resources of the wireless interface to allocate for the first terminal to communicate with the first infrastructure node, the resources being selected from two or more periods of time; and
      allocate the resources for the first terminal to communicate with the first infrastructure node during the two or more periods of time.

2. The base station according to claim 1, wherein
   a second terminal of the one or more terminals is configured to request resources by sending a resource allocation request, and
   the circuitry is further configured to
      receive the resource allocation request from the second terminal;
      identify second communications between the second terminal and the first infrastructure node as non-delay-sensitive communications or as legacy communications;
      identify, based an identification of the second communications between the second terminal and the first infrastructure node as the non-delay-sensitive communications or as the legacy communications, other resources to allocate for the second terminal to communicate with the first infrastructure node, wherein the other resources are selected from a single period of time; and
      allocate the other resources for the second terminal to communicate with the first infrastructure node during the single period of time.

3. The base station according to claim 1, wherein each period of time is at least one of:
   a scheduling assignment period;
   a radio frame;
   a number of radio frames;
   a sub-frame; and
   a number of radio sub-frame.

4. The base station according to claim 1, wherein a measurement comprises relative measurement information for a link between the first terminal and the first infrastructure node; and the relative measurement information is indicative of an evolution in time of measurements for the link between the first terminal and the first infrastructure node.

5. The base station according to claim 1, wherein the circuitry identifies the resources is performed in an absence of a resource allocation request from the first terminal.

6. The base station according to claim 1, wherein the circuitry obtains one or both of the delay-sensitive terminal indicator and the delay-sensitive infrastructure node indicator by at least one of:
   receiving a delay-sensitive terminal indicator from the first terminal;
   receiving a delay-sensitive infrastructure node indicator e one or more infrastructure nodes;
   requesting a delay sensitive terminal indicator from a network element; and
   requesting a delay sensitive infrastructure node indicator from a network element.

7. The base station according to claim 1, wherein the circuitry allocates the resources for the first terminal by sending a resource allocation message to the first terminal and/or to the first infrastructure node.

8. The base station according to claim 1, wherein the circuitry is further configured to de-allocate resources previously allocated for the first terminal to communicate with an infrastructure node other than the first infrastructure node.

9. The base station according to claim 8, wherein the circuitry de-allocates the resources previously allocated for the first terminal comprises sending a resource de-allocation message to the first terminal and/or to the first infrastructure node.

10. The base station according to claim 1, wherein the first terminal communicates with the first infrastructure node, during the two or more periods of time, using the identified and allocated resources.

11. The base station according to claim 1, wherein the first infrastructure node is configured to communicate with the first terminal according to a vehicle-to-everything "V2X" protocol.

12. The base station according to claim 11, wherein the first infrastructure node is further configured to communicate with the first terminal according to a vehicle-to-infrastructure "V2I" protocol.

13. The base station according to claim 1, wherein the first infrastructure node is configured to communicate with the first terminal according to a device-to-device "D2D" protocol.

14. Circuitry for a base station for use in a mobile telecommunications system, the mobile telecommunications system comprising one or more infrastructure nodes configured to communicate with one or more terminals via a wireless interface, the circuitry comprising:
   a control circuit; and
   a transceiver, wherein
   the control circuit and the transceiver are configured to operate together to communicate via the wireless interface with the one or more terminals;
      obtain measurements, wherein a measurement relates to a link between a first terminal of the one or more terminals and a first infrastructure node of the one or more infrastructure nodes;
      obtain one or both of a delay-sensitive terminal indicator associated with the first terminal, and a delay-sensitive infrastructure node indicator associated with the first infrastructure node;
      identify communications between the first terminal and the first infrastructure node as delay-sensitive communications based on the obtained one or both of the delay-sensitive terminal indicator and the delay-sensitive infrastructure node indicator;

identify, based on the measurements and a result of identifying the communications as the delay-sensitive communications, resources of the wireless interface to allocate for the first terminal to communicate with the first infrastructure node, the resources being selected from two or more periods of time; and allocate the resources for the first terminal to communicate with the first of the infrastructure node during the two or more periods of time.

15. The circuitry according to claim 14, wherein the circuitry communicates with the first infrastructure node according to a vehicle-to-everything "V2X" protocol.

16. The circuitry according to claim 14, wherein the circuitry communicates with the first infrastructure node according to a device-to-device "D2D" protocol.

17. An infrastructure node for use in a mobile telecommunications system including a base station configured to communicate via a wireless interface with one or more terminals, the infrastructure node comprising:

circuitry configured to:
receive an allocation message for allocating resources for the infrastructure node to communicate delay sensitive communications with a first terminal, wherein the resources are selected from two or more periods of time; and access, based on the allocation message, the resources to communicate the delay-sensitive communications with the first terminal during the two or more periods of time, wherein communications between the first terminal and the infrastructure node are identified as delay-sensitive communications based on one or both of a delay-sensitive terminal indicator associated with the first terminal and a delay-sensitive infrastructure node indicator associated with the infrastructure node, and the resources are selected according to a result of identifying the communications as the delay-sensitive communications.

18. The infrastructure node according to claim 17, wherein the circuitry is further configured to:
obtain measurements relating to a link between the first terminal and the infrastructure node; and
transmit the measurements to the base station.

19. The infrastructure node according to claim 17, wherein the circuitry is further configured to communicate with the first terminal according to a vehicle-to-everything "V2X" protocol.

20. The infrastructure node according to claim 17, wherein the circuitry is further configured to communicate with the first terminal according to a vehicle-to-infrastructure "V2I" protocol.

* * * * *